US007957559B2

(12) United States Patent
Shima et al.

(10) Patent No.: US 7,957,559 B2
(45) Date of Patent: Jun. 7, 2011

(54) APPARATUS AND SYSTEM FOR RECOGNIZING ENVIRONMENT SURROUNDING VEHICLE

(75) Inventors: Takeshi Shima, Mito (JP); Shoji Muramatsu, Hitachinaka (JP); Yuji Otsuka, Hitachinaka (JP); Kimiyoshi Machii, Novy, MI (US); Mirai Higuchi, Hitachi (JP); Tatsuhiko Monji, Hitachinaka (JP); Kota Irie, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 997 days.

(21) Appl. No.: 11/777,585

(22) Filed: Jul. 13, 2007

(65) Prior Publication Data

US 2008/0013789 A1 Jan. 17, 2008

(30) Foreign Application Priority Data

Jul. 14, 2006 (JP) ................................ 2006-193528

(51) Int. Cl.
*G06K 9/00* (2006.01)

(52) U.S. Cl. ......................... 382/104; 348/113; 701/200

(58) Field of Classification Search .................. 382/100, 382/103, 104, 106, 107; 348/113, 118, 119, 348/120, 143, 144; 701/1, 10, 200
See application file for complete search history.

(56) References Cited

U.S. PATENT DOCUMENTS 5,557,323 A * 9/1996 Kajiwara ...................... 348/140
5,638,116 A * 6/1997 Shimoura et al. ............. 348/118
6,266,442 B1 * 7/2001 Laumeyer et al. ............ 382/190
6,285,393 B1 * 9/2001 Shimoura et al. ............. 348/119
6,324,453 B1 * 11/2001 Breed et al. ...................... 701/45

FOREIGN PATENT DOCUMENTS

JP 3-220410 A 9/1991
JP 6-206196 A 7/1994

* cited by examiner

*Primary Examiner* — Anand Bhatnagar
(74) *Attorney, Agent, or Firm* — Crowell & Moring LLP

(57) ABSTRACT

In conventional systems using an onboard camera disposed rearward of a vehicle for recognizing an object surrounding the vehicle, the object is recognized by the camera disposed rearward of the vehicle. In the image recognized by the camera, a road surface marking taken by the camera appears at a lower end of a screen of the image, which makes it difficult to predict a specific position in the screen from which the road surface marking appears. Further, an angle of depression of the camera is large, and it is a short period of time to acquire the object. Therefore, it is difficult to improve a recognition rate and to reduce false recognition. Results of recognition (type, position, angle, recognition time) made by a camera disposed forward of the vehicle, are used to predict a specific timing and a specific position of a field of view of a camera disposed rearward of the vehicle, at which the object appears. Parameters of recognition logic of the rearwardly disposed camera and processing timing are then optimally adjusted. Further, luminance information of the image from the forwardly disposed camera is used to predict possible changes to be made in luminance of the field of view of the rearwardly disposed camera. Gain and exposure time of the rearwardly disposed camera are then adjusted.

6 Claims, 44 Drawing Sheets

| GAIN VALUE CHANGE TIME OF DAY | GAIN |
|---|---|
| 12h 45min 35sec 490msec | G1 |
| 12h 45min 37sec 300msec | G2 |
| 12h 45min 50sec 290msec | G1 |
| • • • | • • • |

FIG. 10
FRONT CAMERA
INPUT SCREEN
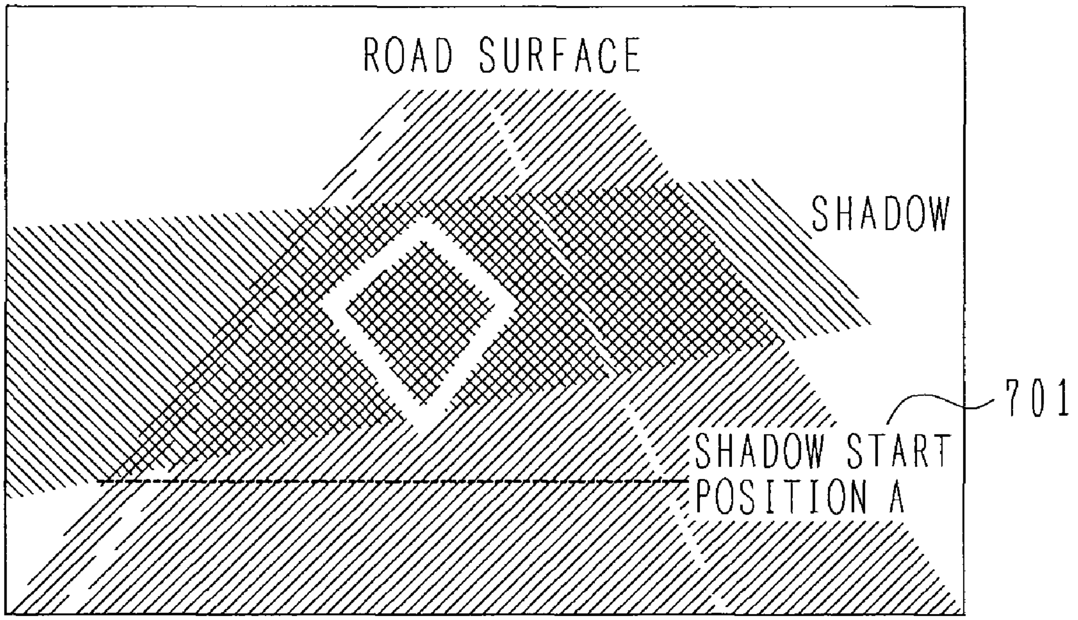
FRONT CAMERA
INPUT SCREEN
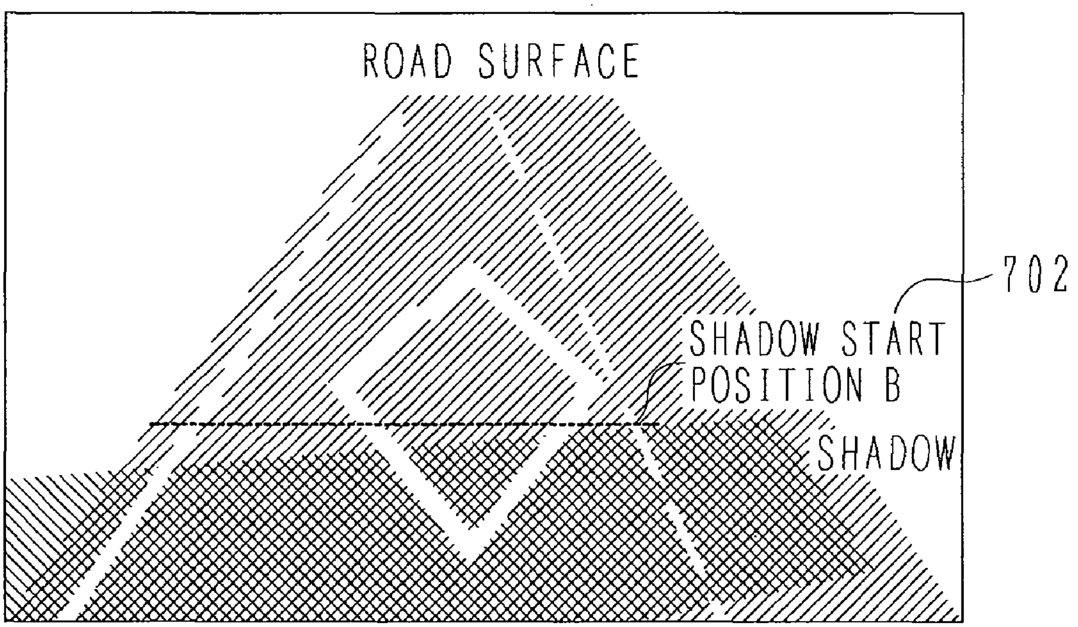

| LUMINANCE B | ROAD SURFACE CONDITION | |
|---|---|---|
| B<b | ROAD SURFACE + SHADOW | 1004 |
| a≦B<b | ROAD SURFACE MARKING + SHADOW | 1005 |
| b≦B<c | ROAD SURFACE + LIGHT | 1006 |
| B≧c | ROAD SURFACE MARKING + LIGHT | 1007 |
| 1002 | 1003 | |

| SCREEN COORDINATE SYSTEM | | ROAD COORDINATE SYSTEM | |
|---|---|---|---|
| u COORDINATE | v COORDINATE | x COORDINATE | y COORDINATE |
| u1 | v1 | x1 | y1 |
| u2 | v2 | x2 | y2 |
| ... | ... | ... | ... |
| 1208 | 1209 | 1210 | 1211 |

| TYPE | ID | POSITION (y COORDINATE) | LUMINANCE VALUE | TIME OF DAY |
|---|---|---|---|---|
| SHADOW START | 56 | 2.0m | b1 | 12h 45min 35sec 490msec |
| SHADOW END | 57 | 2.5m | b2 | 12h 45min 35sec 490msec |
| • • • | • • | • • • | • • • | • • • |

FIG. 25A
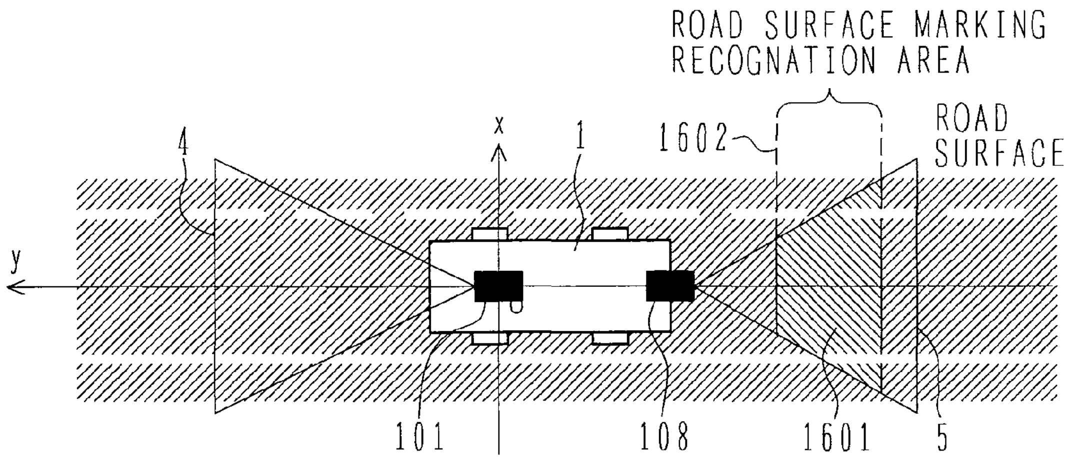
FIG. 25B
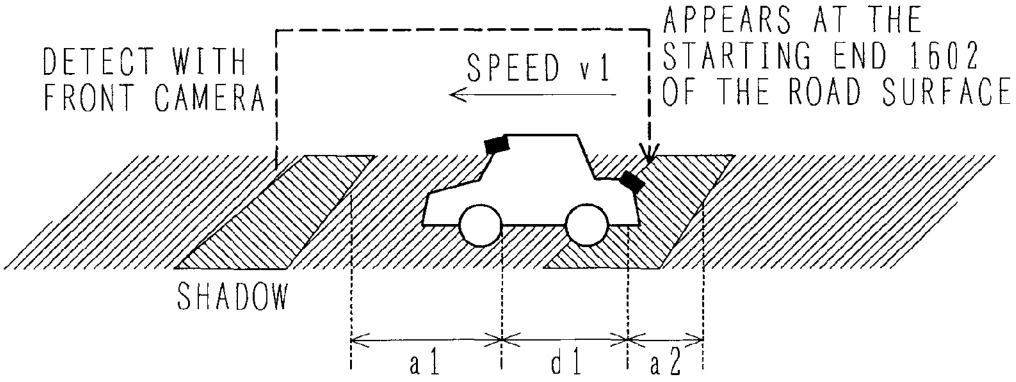
FIG. 26
1701 1702 1703 1704
| TYPE | ID | LUMINANCE VALUE | TIME OF DAY |
|---|---|---|---|
| SHADOW START | 56 | b1 | 12h 45min 37sec 490msec |
| SHADOW END | 57 | b2 | 12h 45min 38sec 600msec |
| . . . | . . | . . . | . . . |

| LUMINANCE VALUE | GAIN |
|---|---|
| b1~b2 | G1 |
| b2~b3 | G2 |
| b3~b4 | G3 |
| • • • | • • • |

| EXPOSURE TIME CHANGE TIME OF DAY | EXPOSURE TIME |
|---|---|
| 12h 45min 35sec 490msec | T1 |
| 12h 45min 37sec 300msec | T2 |
| 12h 45min 50sec 290msec | T1 |
| • • • | • • • |

| LUMINANCE VALUE | EXPOSURE TIME |
|---|---|
| b1~b2 | T1 |
| b2~b3 | T2 |
| b3~b4 | T3 |
| • • • | • • • |

FIG. 35

| FRONT CAMERA OBJECT OF INTEREST TO BE RECOGNIZED (2001) | NEARBY ROAD SURFACE MARKING TYPE (2002) | ASSUMED DISTANCE (2003) |
|---|---|---|
| PEDESTRIAN CROSSING | STOP LINE | D1 |
| STOP LINE | PEDESTRIAN CROSSING | D2 |
| STOP LINE | T INTERSECTION | D3 |
| STOP LINE | INTERSECTION | D4 |
| STOP LINE | STOP MARKING | D5 |
| TRAFFIC LIGHT | PEDESTRIAN CROSSING | D6 |
| TRAFFIC LIGHT | STOP LINE | D7 |
| T INTERSECTION | STOP LINE | D8 |
| INTERSECTION | STOP LINE | D9 |
| STOP MARKING | STOP LINE | D10 |
| STOP SIGN | STOP MARKING | D11 |
| STOP SIGN | STOP LINE | D12 |
| • • • | • • • | • • • |

FIG. 36

| ID (2101) | TYPE (2102) | APPEARANCE TIMING (2103) | POSITION (2104) | ANGLE (2105) | DEGREE OF THIN SPOT IN PAINT (2106) |
|---|---|---|---|---|---|
| 23 | PEDESRRIAN CROSSING | 12h 45min 35sec 490msec | (3,5,0,5) | 93° | HIGH |
| 25 | WHITE LINE | 12h 45min 38sec 500msec | (1,3,1,5) | 10° | LOW |
| | ... | ... | ... | .. | ... |

FIG. 37

| ID (2201) | TYPE (2202) | APPEARANCE TIMING (2203) | POSITION (2204) | ANGLE (2205) | DEGREE OF THIN SPOT IN PAINT (2206) |
|---|---|---|---|---|---|
| 23 | PEDESRRIAN CROSSING | 12h 45min 39sec 590msec | (3,5,0,5) | 93° | HIGH |
| 25 | WHITE LINE | CURRENT TIME OF DAY | (1,3,1,5) | 5° | LOW |
| | . . . | . . . | . . . | . . | . . . |

| ROAD COORDINATE SYSTEM | | SCREEN COORDINATE SYSTEM | |
|---|---|---|---|
| x COORDINATE | y COORDINATE | u COORDINATE | v COORDINATE |
| x1 | y1 | u1 | v1 |
| x2 | y2 | u2 | v2 |
| • • • | • • • | • • • | • • • |
| 2415 | 2416 | 2417 | 2418 |

FIG. 47

| ID (2432) | RECOGNITION AREA u COORDINATE (LEFT) (2433) | RECOGNITION AREA u COORDINATE (RIGHT) (2434) | CHANGE IN THE LUMINANCE VALUE BETWEEN THE ROAD SURFACE AND THE ROAD SURFACE MARKING (2435) | MAXIMUM VALUE OF THE ROAD SURFACE MARKING LUMINANCE VALUE (2436) |
|---|---|---|---|---|
| 23 | u1 | u2 | 35 | 200 |
| 25 | u3 | u4 | 34 | 150 |
| ... | ... | ... | ... | ... |

APPARATUS AND SYSTEM FOR RECOGNIZING ENVIRONMENT SURROUNDING VEHICLE

BACKGROUND OF THE INVENTION

1. Field of the Invention

The specification relates to an apparatus and system that process images taken by a camera mounted in a vehicle and recognize road surface markings, traffic lights, signs, and the like on roads that surround the vehicle.

2. Description of the Related Art

JP-A-3-220410 discloses an apparatus that processes images taken by a camera mounted in a vehicle and recognizes road surface markings.

JP-A-6-206196 discloses an apparatus including cameras disposed forwardly and rearwardly of a vehicle. The apparatus detects contrast of an image taken by the forward camera and, if it is hard to obtain information on a forward image, uses information obtained by the rearward camera to recognize environment surrounding the vehicle.

SUMMARY OF THE INVENTION

The apparatus disclosed in JP-A-3-220410 has the onboard camera disposed rearwardly of the vehicle for recognizing the road surface markings. The road surface marking appears from a lower end of a screen of an image taken by the camera, which makes it difficult to predict a specific position in the screen from which the road surface marking appears. In addition, the camera has a large angle of depression at an installation position thereof, so that only a narrow portion of the road surface falls within a field of view of the camera. It is therefore an extremely short period of time for an object to be recognized to be acquired. Accordingly, it is difficult to improve a recognition rate and reduce false recognition.

The apparatus disclosed in JP-A-6-206196, on the other hand, selects either the forward camera or the rearward camera, active at one time, and there is no data exchange taking place between the forward and rearward cameras. The two cameras are not thus utilized effectively. There is therefore room for further improving the recognition rate and reduce false recognition.

In a system recognizing an object to be recognized, such as a road surface marking or the like, by processing an image taken by a first camera disposed rearwardly of a vehicle, results of recognition (type, position, and angle of the object of interest recognized, and a time of recognition) made by a second camera, such as a camera or the like disposed forwardly of the vehicle, are used to predict a specific timing and a specific position of a field of view of the rearwardly disposed first camera, at which the object to be recognized appears. Parameters (a recognition area, a threshold value for extracting a characteristic quantity, and the like) of recognition logic of the rearwardly disposed first camera and processing timing are then adjusted.

Luminance information of the image taken by the second camera, such as a camera or the like disposed forwardly of the vehicle, is used to predict possible changes to be made in luminance of the field of view of the rearwardly disposed first camera. Gain and exposure time of the rearwardly disposed first camera are then adjusted. Parameters (gain and exposure time) of the first camera are thereby adjusted even more quickly, so that even more accurate recognition of the object to be recognized can be achieved.

An improved recognition rate of the object to be recognized and reduced false recognition can be achieved as compared with the apparatus using only a single camera.

BRIEF DESCRIPTION OF THE DRAWINGS

FIG. 8 shows a rear camera gain value schedule table.

FIG. 10 is a view illustrating a method of representing a position of a shadow in a front camera.

FIG. 23 shows front camera shadow position data.

FIGS. 25A and 25B are views illustrating a road surface marking recognition area of the rear camera.

FIG. 26 shows rear camera shadow position data.

FIG. 27 shows a table of image luminance and gain values.

FIG. 29 shows a rear camera exposure time schedule tables.

FIG. 31 shows a table of image luminance and exposure time.

FIG. 35 shows nearby road surface marking data.

FIG. 36 shows front camera recognition result data.

FIG. 37 shows data on an object to be recognized by the rear camera.

FIG. 47 shows recognition parameter data.

DETAILED DESCRIPTION OF THE PREFERRED EMBODIMENTS

Preferred embodiments will be described below with reference to the accompanying drawings.

First Embodiment

A first embodiment will be described as applied to a system recognizing road surface markings by using images taken by a rear camera mounted in a vehicle.

Figure 1:
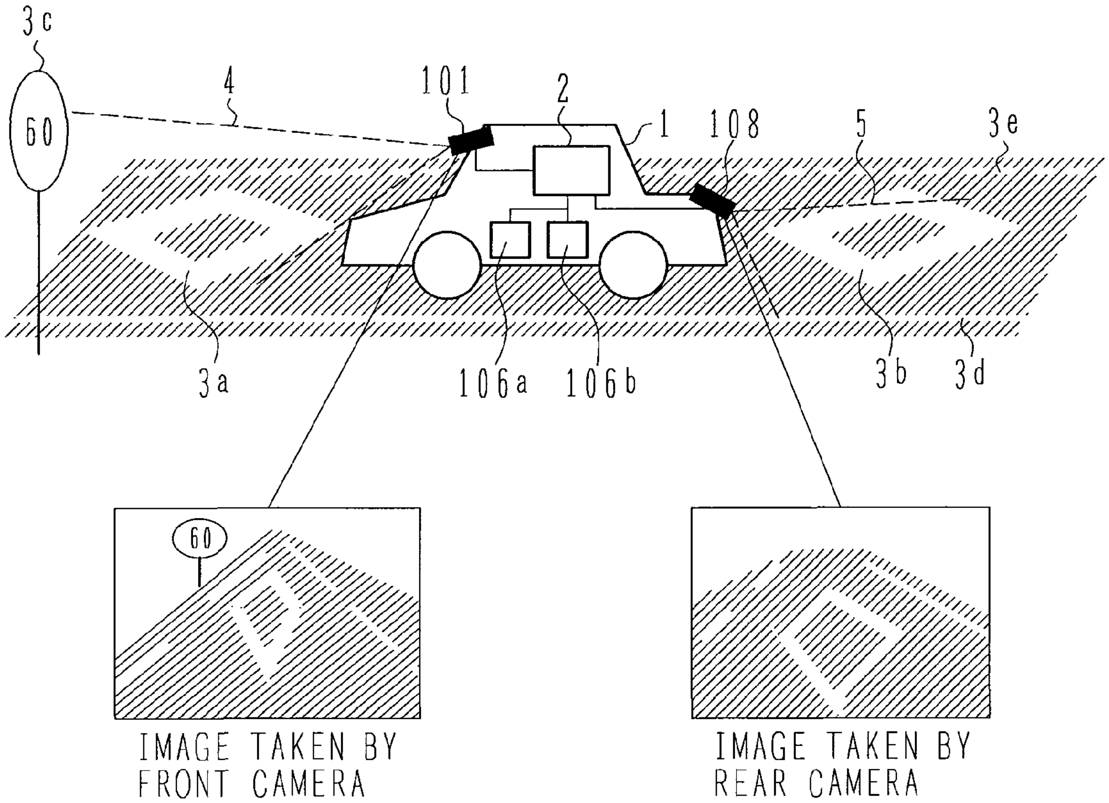
FIG. 1 is a view illustrating an embodiment.

FIG. 1 is a view showing a system for recognizing an environment surrounding a vehicle according to the first embodiment. A vehicle 1 has a front camera 101 and a rear camera 108 mounted thereon. The front camera 101 takes an image of a view forward of the vehicle 1. The rear camera 108 takes an image of a view rearward of the vehicle 1. The front camera 101 is mounted such that a road surface falls within a field of view 4 of the front camera 101. The rear camera 108 is mounted such that the road surface falls within a field of view 5 of the rear camera 108.

Image information captured by the front camera 101 is inputted to a surrounding environment recognition apparatus 2. The surrounding environment recognition apparatus 2 recognizes a road surface marking 3*a* forward of the vehicle 1 based on the image information inputted thereto. It is to be noted that an arrangement may be made to recognize white lines 3*d*, 3*e*, a sign 3*c*, and a traffic light (not shown). Road surface markings, white lines, signs, and traffic signals will hereinafter be collectively referred to as "road surface marking or the like." The "road surface marking" refers to traffic signs marked on the road, typically including pedestrian crossings, stop lines, maximum speed limit markings, follow directions, and no U-turn markings.

Similarly, image information captured by the rear camera 108 is inputted to the surrounding environment recognition apparatus 2. The surrounding environment recognition apparatus 2 recognizes a road surface marking 3*b* rearward of the vehicle 1 based on the image information inputted thereto. The surrounding environment recognition apparatus 2 transmits information on the road surface markings to a vehicle control apparatus 106*a* or an onboard information apparatus 106*b* via a communication path. It is to be noted herein that the vehicle control apparatus 106*a* may typically be a cruise control apparatus, a headway control apparatus, or a traffic congestion follow-up control apparatus for controlling acceleration and deceleration of the vehicle according to the surrounding environment. The vehicle control apparatus 106*a* provides control in accordance with the information on the road surface markings transmitted from the surrounding environment recognition apparatus 2. The onboard information apparatus 106*b*, on the other hand, may typically be a navigation apparatus that corrects the position of a host vehicle based on the information on the road surface markings transmitted from the surrounding environment recognition apparatus 2.

Figure 2:
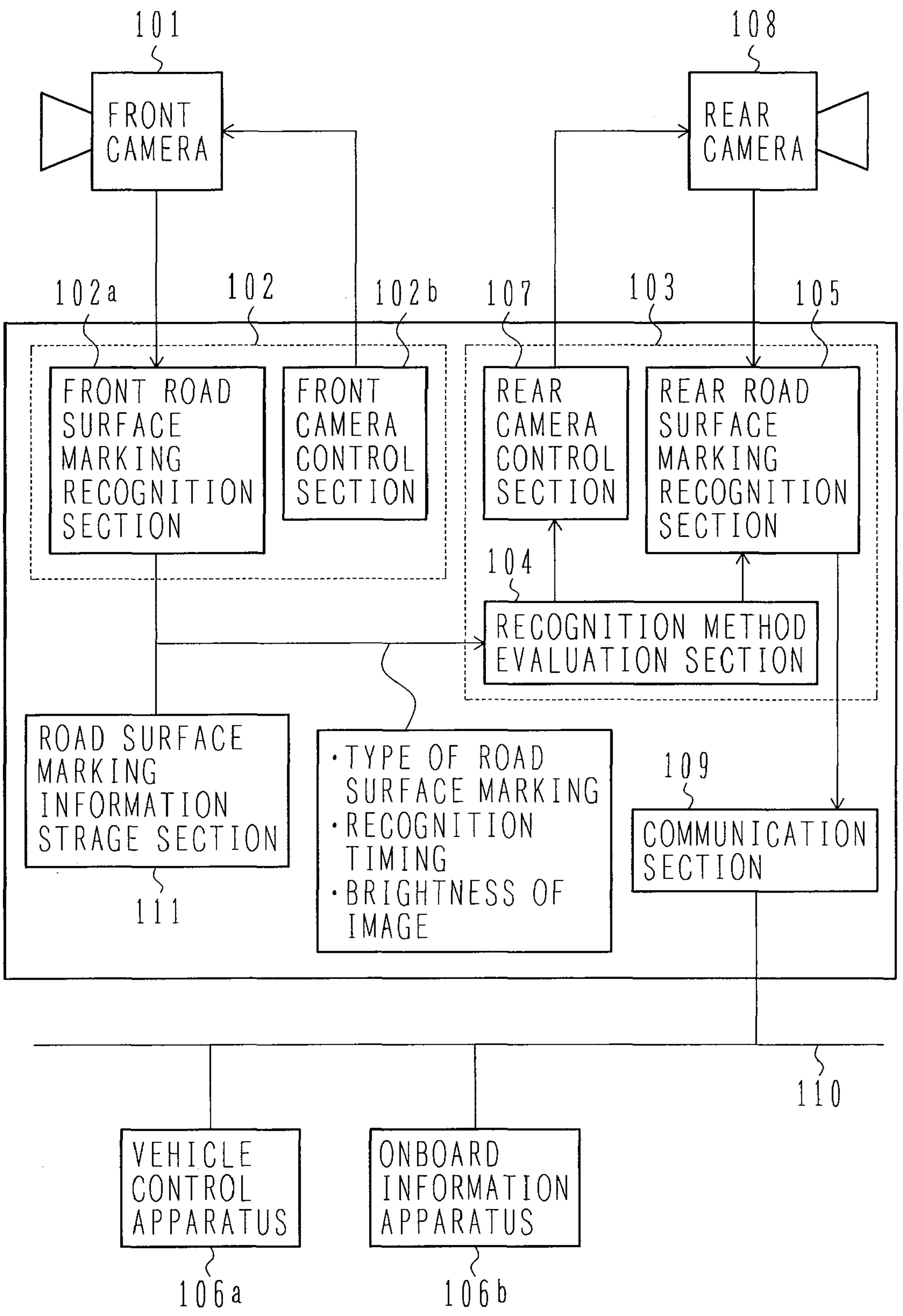
FIG. 2 is a view illustrating the embodiment.

FIG. 2 is a functional block diagram of the aforementioned surrounding environment recognition apparatus 2. The surrounding environment recognition apparatus 2 includes a front camera image recognition unit 102 and a rear camera image recognition unit 103.

The front camera image recognition unit 102 includes a front road surface marking recognition section 102*a* and a front camera control section 102*b*. The front road surface marking recognition section 102*a* recognizes the road surface marking or the like from the image information captured by the front camera 101. The front camera control section 102*b* controls imaging conditions (timing, cycle, exposure time, zoom, and the like) of the front camera 101. The front camera control section 102*b* may be omitted if the imaging conditions of the front camera 101 are fixed.

The front road surface marking recognition section 102*a* recognizes the road surface marking or the like by performing image processing, including binarization, edge extraction, pattern matching, and the like, for the image information captured by the front camera 101. Specifically, the front road surface marking recognition section 102*a* detects the type, position, angle, and the like of the road surface marking or the like in the image.

The rear camera image recognition unit 103 includes a rear road surface marking recognition section 105, a rear camera control section 107, and a recognition method evaluation section 104. The rear road surface marking recognition section 105 recognizes the road surface marking or the like from the image information captured by the rear camera 108. The rear camera control section 107 controls imaging conditions (timing, cycle, exposure time, zoom, and the like) of the rear camera 108. The recognition method evaluation section 104, on the other hand, determines the imaging conditions of the rear camera 108 and specific details of image processing performed in the rear road surface marking recognition section 105 based on the information inputted from the front road surface marking recognition section 102*a*. The recognition method evaluation section 104 then transmits information to the rear camera control section 107 and the rear road surface marking recognition section 105.

Instead of directly inputting results of recognition made by the front road surface marking recognition section 102*a* to the recognition method evaluation section 104 as described above, it may still be arranged so that the results of recognition are stored in a road surface marking information storage section 111 and the stored results are inputted to the recognition method evaluation section 104. Such arrangements allow communication timing and processing timing to be adjusted. It is further possible to identify differences among a plurality of images taken at different timings, so that information on changes in the surrounding environment with time can be transmitted to the recognition method evaluation section 104.

The rear camera control section 107 captures an image by controlling the rear camera 108 using conditions specified by the recognition method evaluation section 104. The rear road surface marking recognition section 105 recognizes the road surface marking or the like by performing the image processing specified by the recognition method evaluation section 104 for the image information captured under the foregoing conditions. Specifically, the rear road surface marking recognition section 105 detects the type, position, angle, and the like of the road surface marking or the like in the image.

Processing performed by the aforementioned rear camera image recognition unit 103 will be described below with reference to FIGS. 3 and 6.

Figure 3:
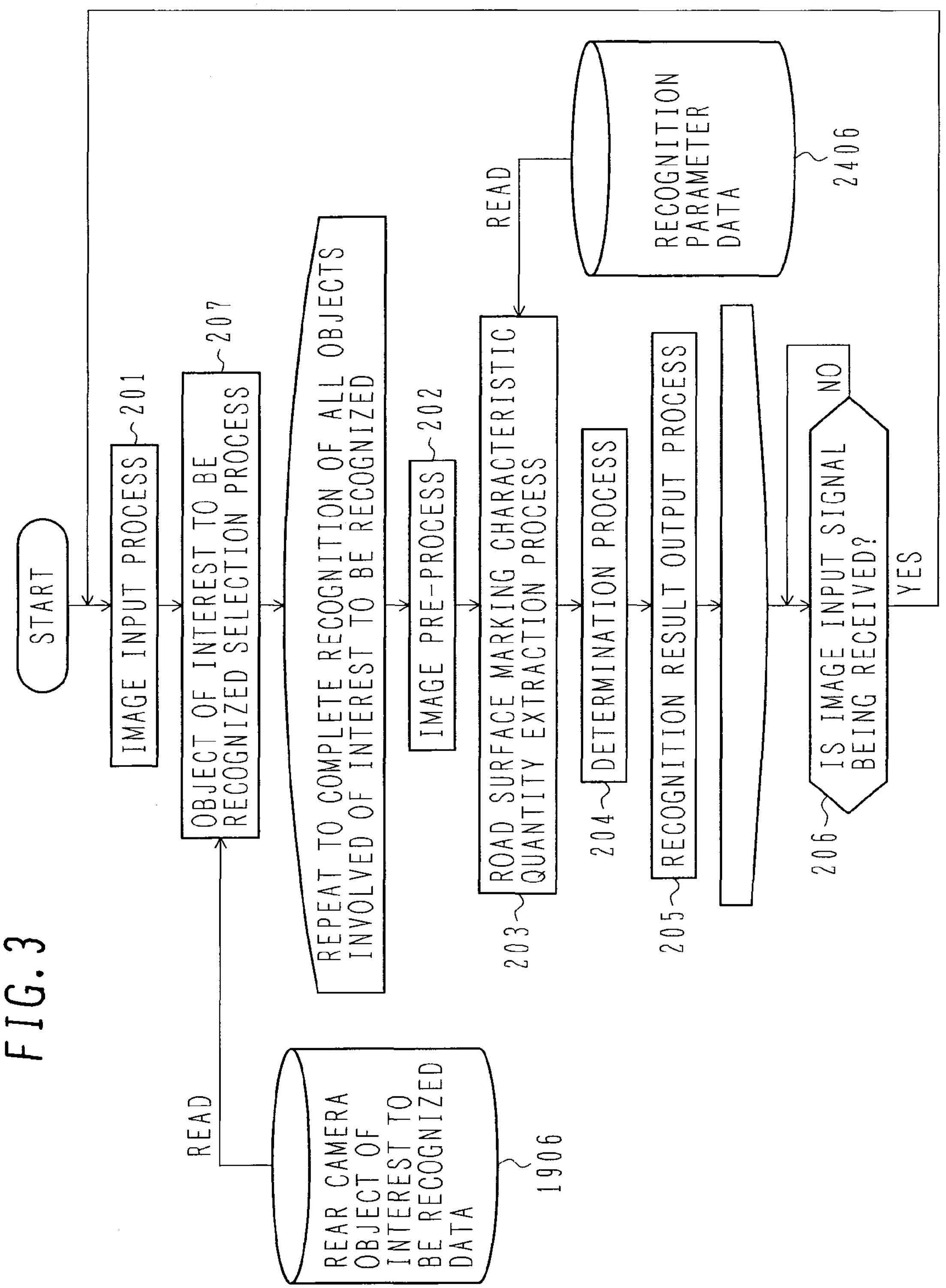
FIG. 3 is a flowchart showing processes executed by a road surface marking recognition function of a rear camera image recognition function.

FIG. 3 is a flowchart showing processes executed by the rear road surface marking recognition section 105.

An image taken by the rear camera 108 is acquired in step 201 of performing an image input process.

In step 207 of selecting an object to be recognized, data 1906 on an object to be recognized by the rear camera is read and the type of the road surface marking or the like to be recognized by the rear camera 108 is extracted.

The data 1906 on the object to be recognized by the rear camera is listed in a table of FIG. 37. Referring to FIG. 37, reference numeral 2202 represents a type of object to be recognized. Reference numeral 2203 represents an estimated time of appearance at which the object to be recognized appears in the field of view of the rear camera 108. The data 1906 on the object to be recognized by the rear camera is created by the recognition method evaluation section 104 based on front camera recognition result data 806 (FIG. 36) inputted from the front road surface marking recognition section 102*a*. A method of creating the data 1906 on the object to be recognized by the rear camera will be described later. In step 207, a current time is referred to in the table of FIG. 37 and, if it is found that the current time reaches the estimated time of appearance 2203, the object to be recognized in question is extracted as the object to be recognized.

Processes for recognizing each of the road surface markings to be recognized will next be performed in steps 202 through 205.

Figure 4:
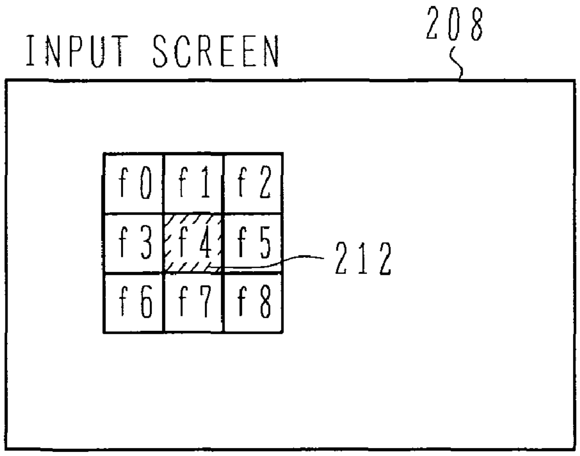
FIG. 4 is a view illustrating an image pre-process in the flowchart shown in FIG. 2.

Specifically, in step 202 of performing an image pre-process, noise is removed from the image acquired in the step 201 of performing the image input process. The noise removal process is not mandatory for the present invention. It is, however, desirable that the noise removal process be performed since noise can very often be a hindrance to recognition of the road surface marking or the like. Noise of various kinds can be conceivable. The objects of interest to be recognized in the first embodiment are the road surface markings and white lines on the road. Understandably, therefore, a problem that needs special attention is noise arising from a "thin spot" in paint. In accordance with the first embodiment, a process is performed for removing the "thin spot" of the road surface marking paint, so that characteristic quantities of the road surface markings and white lines can be more easily extracted. Typically, the thin spot removal process includes the following method. Specifically, referring to FIG. 4, of luminance values of pixels of 3-by-3 regions f0 to f8 adjoining around a specific pixel f4 (212) of an input screen 208, the maximum luminance value is replaced as the luminance value of the specific pixel f4. This results in the luminance value of the brightest portion of the surrounding pixels becoming the brightness of the specific pixel, so that the thin spot can be corrected.

Figure 5:
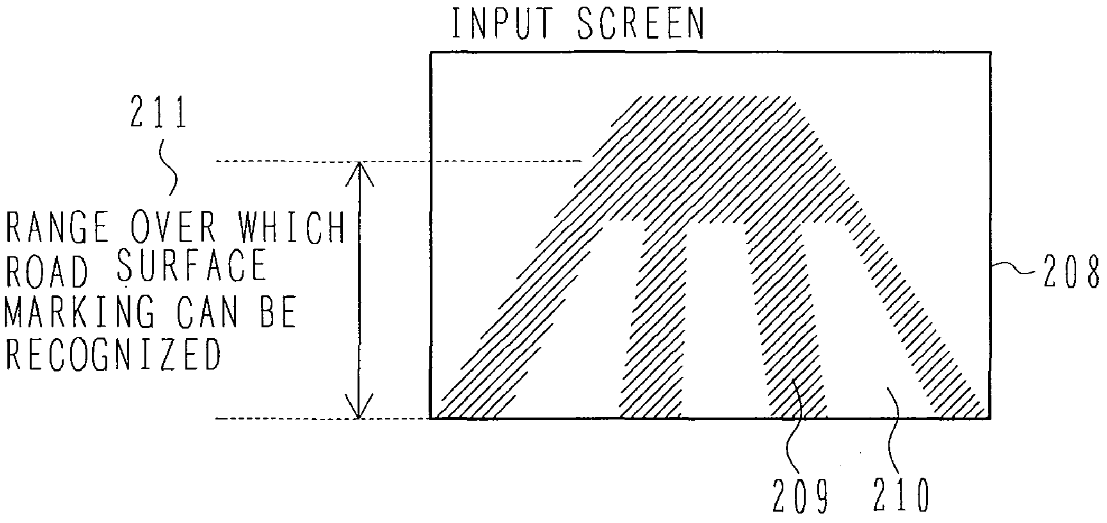
FIG. 5 is a view illustrating a road surface marking characteristic quantity extraction process in the flowchart shown in FIG. 2.

In step 203 of performing a road surface marking characteristic quantity extraction process, a change in the luminance value between a road surface 209 and a road surface marking 210 in the input screen 208 of FIG. 5 is detected to extract an outline of the road surface marking 210. At this time, the outline of the road surface marking 210 to be recognized is detected by reading recognition parameter data 2406, and referring to recognition areas 2433, 2434, an estimated value 2435 of the change in the luminance value between the road surface and the road surface marking, and an estimated value 2436 of the maximum value of the road surface marking luminance value shown in FIG. 47. The recognition parameter data 2406 defines a position on the image of the rear camera 108, at which the road surface marking or the like to be recognized is expected to appear, and an threshold value and the like of edge extraction for recognizing the road surface marking or the like. The recognition parameter data 2406 is created by the recognition method evaluation section 104 based on the front camera recognition result data 806 (FIG. 36) inputted from the front road surface marking recognition section 102*a*. A specific method for creating the recognition parameter data 2406 will be described in detail later.

In step 204 of performing a determination process, it is determined whether or not the outline of the road surface marking 210 extracted in step 203 of performing the road surface marking characteristic quantity extraction process coincides with characteristics of the road surface marking of interest selected in step 207 of performing the object of interest to be recognized selection process. Specifically, the rear road surface marking recognition section 105 has template data corresponding to outlines of the road surface markings or the like that are expected to occur. The outline of the road surface marking or the like recognized from the image taken by the rear camera 108 is compared with the template data. If there is found a match between the outline and the template data, or if a difference between the two falls within a predetermined range, it is determined that the road surface marking in question is recognized. Alternatively, an arrangement may be made, in which the recognition method evaluation section 104 attaches template data required when sending the front camera recognition result data 806.

In step 205 of performing a recognition result output process, if the road surface marking to be recognized has been recognized in step 204 of performing a determination process, an output of a type of the road surface marking recognized, a position of the road surface marking relative to the vehicle, and an angle of the road surface marking relative to the vehicle are produced to the vehicle control apparatus 106*a* or an onboard information apparatus via a communication section 109.

The following consideration should be noted. Specifically, if a plurality of objects of interest to be recognized are read in step 207 for the input of a single image in step 201, processes from steps 202 through 205 are repeated to complete recognition of all objects involved of interest to be recognized. If the front camera recognition result data 806 contains, for example, two objects of interest to be recognized of a pedestrian crossing and a stop line, steps from 202 to 205 are first performed for the recognition of the pedestrian crossing, which is thereafter followed by steps from 202 to 205 performed for the recognition of the stop line.

The operation proceeds to branch 206, if the aforementioned processes are completed for all objects of interest to be recognized read in step 207. If no new image input signal is received in branch 206, the operation is set into a wait state. If a new image input signal is received in branch 206, the operation returns to step 201.

Figure 6:
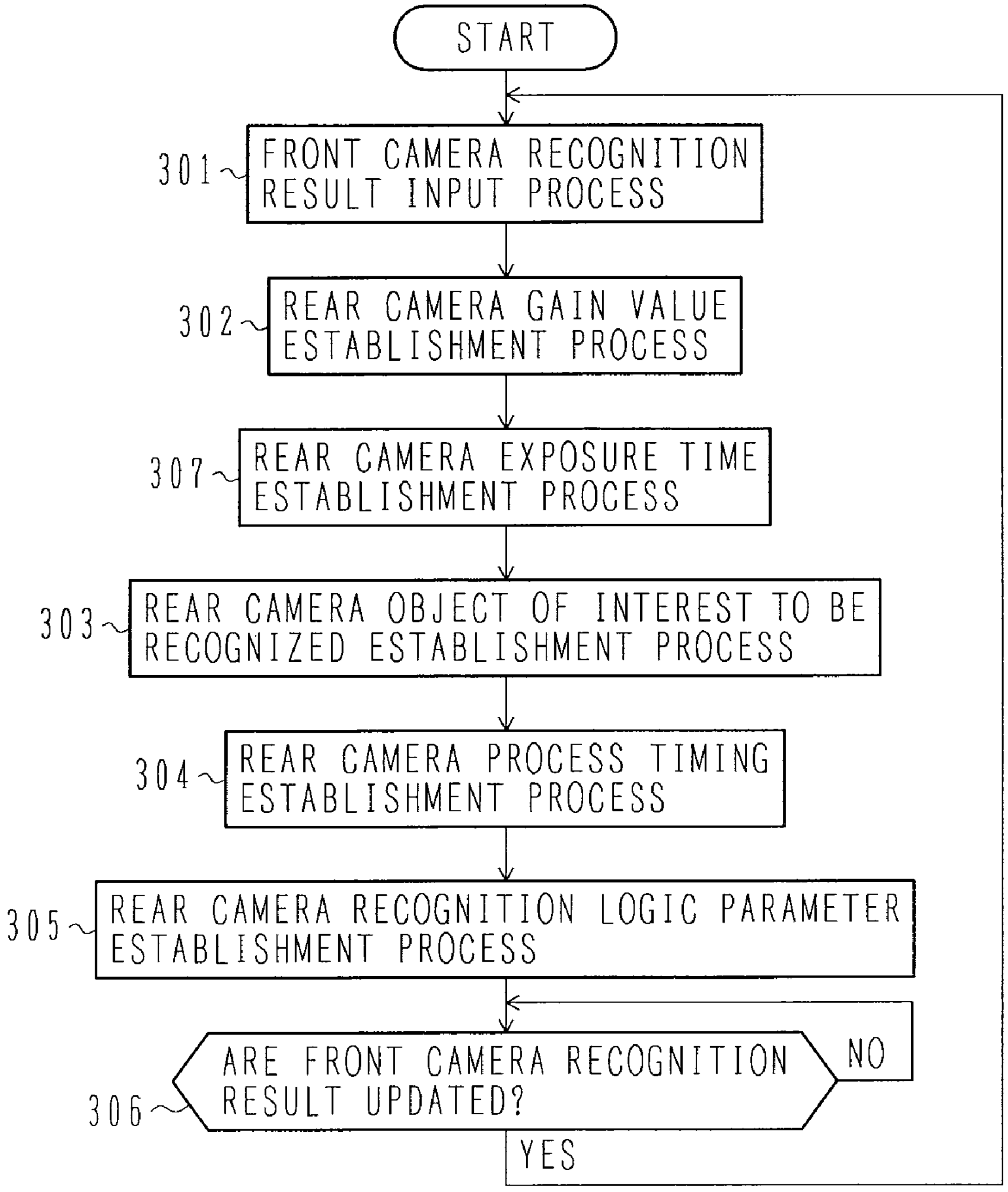
FIG. 6 is a flowchart showing processes executed by a recognition method evaluation function of the rear camera image recognition function.

FIG. 6 is a flowchart showing processes executed by the recognition method evaluation section 104.

In step 301 of performing a front camera recognition result input process, data of recognition result based on the image taken by the front camera 101 is acquired from the front road surface marking recognition section 102*a* (or the road surface marking information storage section 111). For the recognition result data, recognition results of the road surface marking or the like in the image taken by the front camera 101, luminance information of the image taken by the front camera 101, and information on shadows on the road surface are obtained. The front camera recognition results will be described in detail with reference to processes from steps 302 to 306 that follow.

In step 302 of performing a rear camera gain value determination process, the information on the shadows on the road surface in the image taken by the front camera 101 obtained in step 301 is analyzed and a gain value of the rear camera 108 is determined. This process will be described in detail later.

In step 307 of performing a rear camera exposure time determination process, the luminance information of the image taken by the front camera 101 obtained in step 301 is analyzed and an exposure time of the rear camera 108 is determined. Again, this process will be described in detail later.

In step 303 of the rear camera object to be recognized determination process, the object to be recognized in the rear camera 108 is determined based on the recognition results of the road surface markings, white lines, traffic lights, and signs in the image taken by the front camera 101 as obtained in step 301. In step 304 of performing the rear camera process timing determination process, timing at which the processing for recognizing the object to be recognized in the rear camera 108 is determined. Processes performed in steps 303 and 304 will be described in detail later.

In step 305 of a rear camera recognition logic parameter determination process, parameter values of various kinds in recognition logic of the object to be recognized are determined based on the recognition results of the road surface markings and white lines within the front camera image and information on the shadow on the road surface within the front camera image obtained in step 301. The process performed in step 305 will be described in detail later.

Finally in branch 306, if the recognition results of the front camera 101 are not updated, the operation is set into a wait state. If the recognition results of the front camera 101 are updated, the operation returns to step 301.

In the first embodiment described heretofore, processes of steps 302 and 307, and from 303 to 305, are performed in series. Performing all these steps is not, however, mandatory. Rather, some processes to be adopted are appropriately selected and combined, and thereby performed according to possible use conditions. In any combination, accuracy of the rear camera 108 recognizing the road surface marking or the like can be enhanced as compared with the known art. Step 302 of the rear camera gain value determination process or step 307 of performing the rear camera exposure time determination process is to be performed in advance of steps from 303 to 305. This is because of the following reasons. Specifically, steps from 303 to 305 are performed on the assumption that the rear camera 108 has successfully imaged an object to be recognized. It is therefore necessary that imaging conditions (gain, exposure time) of the rear camera 108 be changed prior to the processes of the steps from 303 to 305, so that the object to be recognized can be imaged in accordance with the condition of brightness of surrounding areas.

In accordance with the first embodiment, the front road surface marking recognition section 102*a* is adapted to input the type of the road surface marking or the like recognized to the recognition method evaluation section 104.

The road surface markings may be, as described earlier, a pedestrian crossing, a stop line, a maximum speed limit marking, a follow direction, a no U-turn marking, and the like. Each of these road surface markings has unique graphic characteristics. Accordingly, different ideal image processing algorithms can apply according to different types of the road surface marking. According to the arrangements of the first embodiment, the type of the road surface marking or the like is first identified with the front camera 101 before the rear camera 108 is notified of the type, so that the appropriate image processing algorithm can be selected. This reduces possibility that the rear camera 108 erroneously recognizes or does not recognize (fails to recognize) a road surface marking.

In accordance with the first embodiment, the front road surface marking recognition section 102*a* is adapted to detect the brightness of the image taken by the front camera 101 and the shadow in the image and input the information to the recognition method evaluation section 104. Specifically, luminance of the entire image is detected by analyzing the luminance information of the image. The recognition method evaluation section 104 plans an adequate gain (aperture) and exposure time (shutter speed) of the rear camera 108 and sends the data to the rear camera control section 107. The rear camera control section 107 controls the rear camera 108 based on the commands of the gain and exposure time of the rear camera 108 received from the recognition method evaluation section 104.

Even if the image taken by the front camera 101 is, for example, too bright or too dark so that the road surface marking or the like is not clearly imaged, therefore, the rear camera 108 can take an image with the gain and exposure appropriate for the ambient brightness. This allows the rear camera 108 to image the road surface marking or the like even more clearly, so that the road surface marking or the like can be recognized. This effect is particularly conspicuous in conditions of frequently varying ambient brightness, such as in shadows of buildings or the like cross the road surface.

[Rear Camera Gain Value Determination Process]

Of the processes executed by the recognition method evaluation section 104 shown in FIG. 2, a detailed embodiment of the step 302 of performing the rear camera gain value determination process will be described with reference to FIGS. 4 through 10 and 22 through 26.

Figure 7:
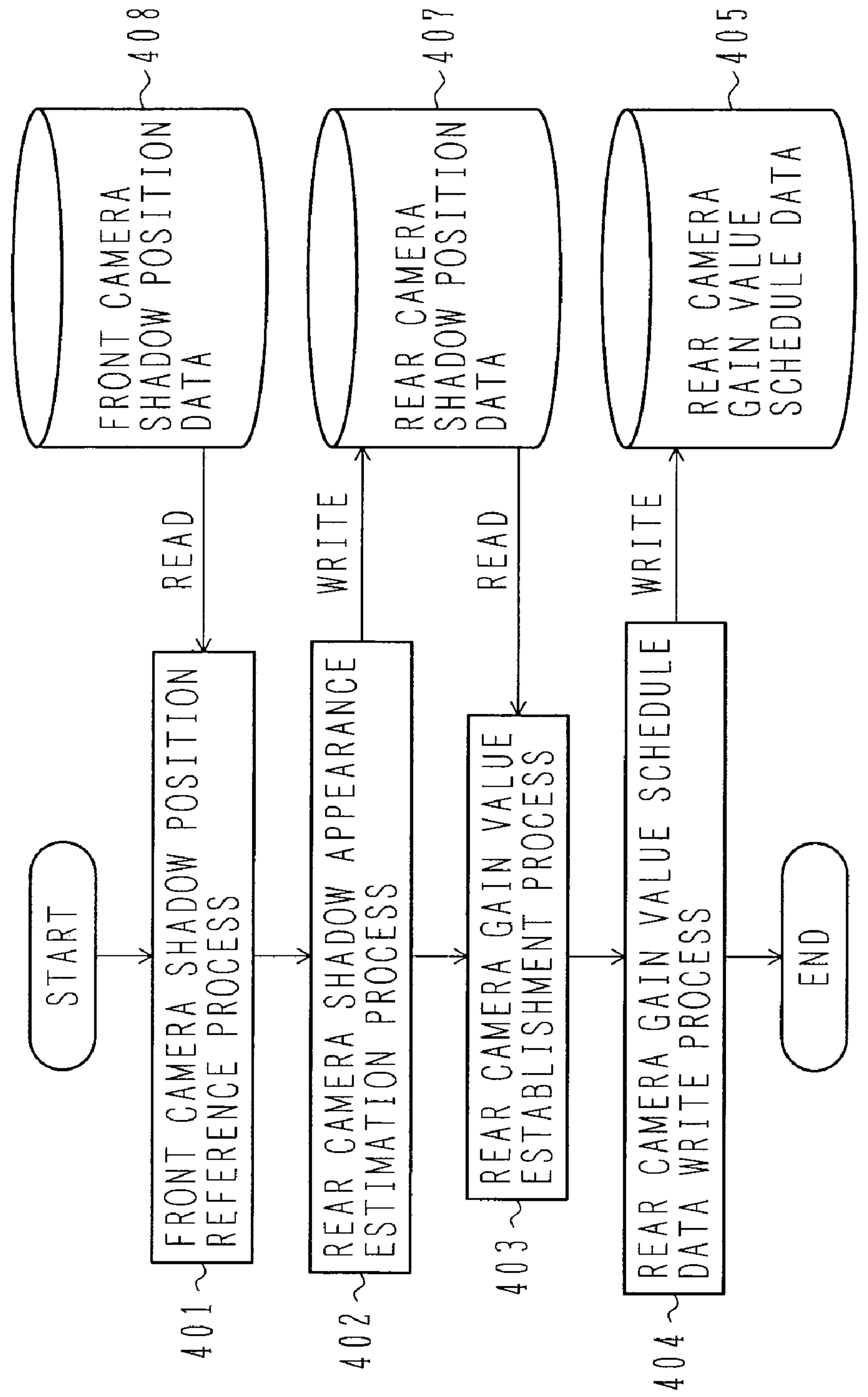
FIG. 7 is a detailed flowchart showing a rear camera gain value determination process of the recognition method evaluation function of the rear camera image recognition function.

FIG. 7 is a detailed flowchart showing the step 302 of the rear camera gain value determination process.

In step 401 of performing a front camera shadow position reference process, front camera shadow position data 408, which describes the position of a shadow on the road surface in the front camera image, is obtained. The front camera shadow position data 408 is created by the front road surface marking recognition section 102*a* based on the image taken by the front camera 101. The front camera shadow position data 408 is either included in the front camera recognition result data 806 or stored in the road surface marking information storage section 111 and referred to by the recognition method evaluation section 104. A process performed by the front road surface marking recognition section 102*a* for detecting the shadow in the front camera image will be described later.

Figures 21, 22:
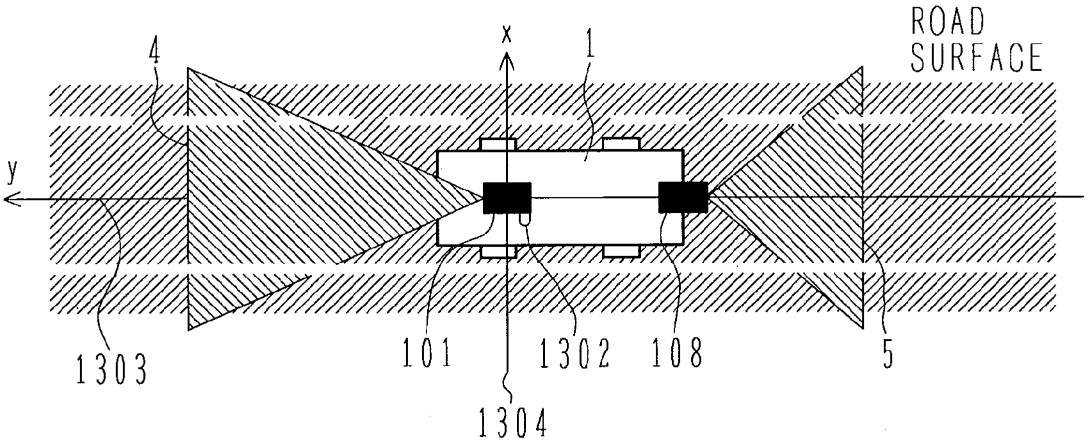
FIG. 21 shows a conversion table for conversion between a road coordinate system and a screen coordinate system.
FIG. 22 is a view illustrating the road coordinate system.

Referring to FIG. 10, the position of the shadow on the road surface in the front camera image is represented by a shadow start position A (701) and a shadow end position B (702). The shadow position of FIG. 10 is then translated to a corresponding value on a road coordinate system shown in FIG. 22 and represented by a table format shown in FIG. 23. Referring to FIG. 22, let a point on the road surface immediately below a center of a lens of the front camera 101 be an origin 1302. Further, let a straight line 1303, which is an optical axis of the front camera 101 projected onto the road surface, be an y-axis and let a straight line 1304, which passes through the origin 1302 and extends on the road surface orthogonally relative to the y-axis, be an x-axis. Then, the shadow is represented by a data string as shown in FIG. 23 relative to the road coordinate system. Specifically, the data string includes a type 1401 indicating whether the data is the shadow start position or the shadow end position; an ID number 1402; a position (y coordinate in the road coordinate system) 1403; a luminance mean value 1404; and shadow detection time 1406.

In step 402 of performing a rear camera shadow appearance estimation process, specific time is estimated, at which the shadow on the road surface detected by the front camera 101 appears in the field of view of the rear camera 108. The estimated results are written in rear camera shadow position data 407.

Figure 24:
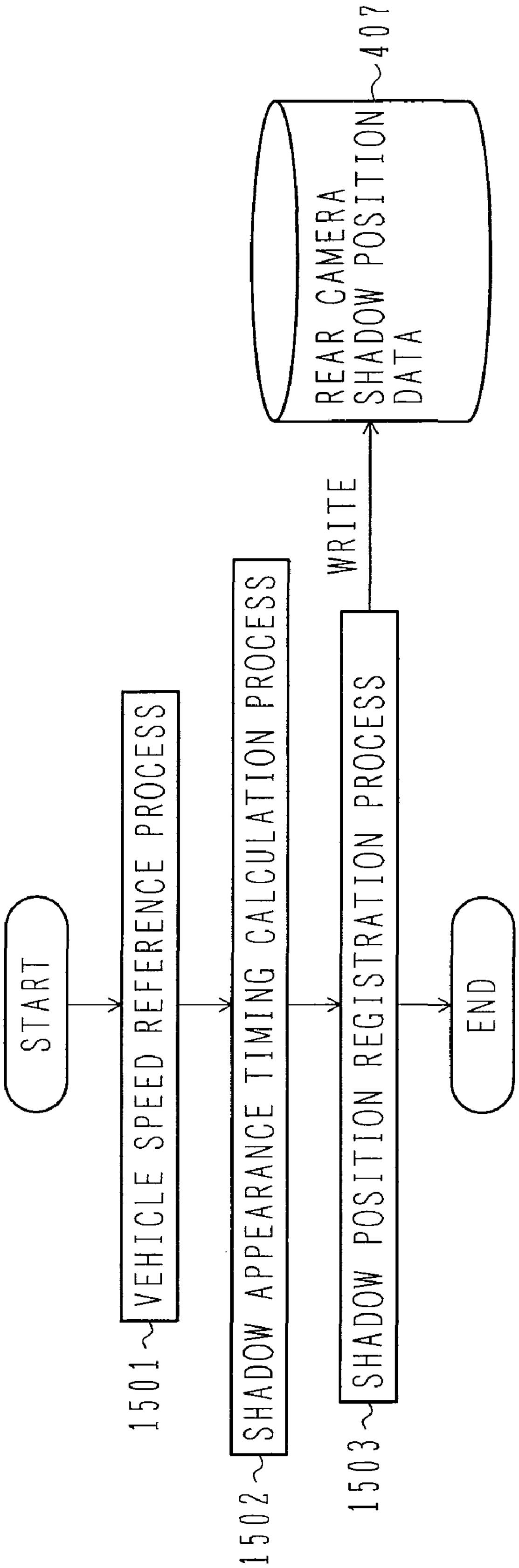
FIG. 24 is a flowchart showing a rear camera shadow appearance estimation process of a rear camera exposure time determination process as part of the recognition method evaluation function of the rear camera image recognition function.

Step 402 will be described in detail with reference to FIGS. 24, and 25A and 25B. FIG. 24 is a detailed flowchart showing step 402 of performing the rear camera shadow appearance estimation process.

In step 1501 of performing a vehicle speed reference process, a vehicle speed current value v1 is obtained.

In step 1502 of performing a shadow appearance timing calculation process, timing is calculated, at which the shadow on the road surface appears at a starting end 1602 of a road surface marking recognition area 1601 shown in FIG. 25A. Referring to FIG. 25A, the origin, the x-axis, and the y-axis constitute the road coordinate system described with reference to FIG. 22. Reference numeral 5 represents the field of view of the rear camera 108. A marking 1601 forming part of the field of view 5 is a road surface marking recognition area that starts at a starting end 1602. The road surface marking recognition area 1601 corresponds to a range 211 shown in FIG. 5, within which the road surface marking appears in the screen and fades out, and over which an adequate level of resolution allowing the road surface marking to be recognized can be obtained.

Referring to FIGS. 25A and 25B, when a2 is a y-coordinate value of the starting end 1602 of the road surface marking recognition area in the road coordinate system; a1, a y-coordinate value of the shadow detected by the front camera 101 in the road coordinate system; t1, time at which the shadow is detected; and d1, a distance between the position at which the front camera 101 is installed and that at which the rear camera 108 is installed, a time t2, at which the shadow detected by the front camera 101 appears at the starting end 1602 of the road surface marking recognition area, is given by the following equation:

$$t2=t1+(a1+d1+|a2|)/v1$$

Finally in step 1503 of performing a shadow position registration process, the shadow appearance timing estimated in step 1502 of performing the shadow appearance timing calculation process is written in the rear camera shadow position data 407. The rear camera shadow position data 407 is defined as a table shown in FIG. 26. The rear camera shadow position data 407 includes information of a type 1701 indicating whether the data is the shadow start position or the shadow end position; an ID number 1702; an estimated luminance value 1703; and an estimated time of shadow appearance 1704. The estimated luminance value 1703 is identical to the luminance mean value 1404 of the front camera shadow position data of FIG. 23.

Referring back to the flowchart shown in FIG. 7, in step 403 of performing the rear camera gain value determination process, the rear camera shadow position data 407, which represents the shadow appearance timing in the rear camera field of view estimated in step 402, is obtained. Then, in accordance with the estimated luminance value of the shadow, the gain value of the rear camera 108 is determined and a rear camera gain value schedule table shown in FIG. 8 is created.

Referring to FIG. 8, the table shows gain value change time 501 indicating the specific timing at which gain values are changed and a gain value 502 selected at each timing of the gain value change time 501. The gain value 502 is determined based on an estimated value of luminance of the shadow that is expected to appear within the field of view of the rear camera 108. The gain is determined with reference to a table of FIG. 27 showing luminance 1801 and a gain value 1802 of the shadow. The table shown in FIG. 27 is created by conducting an advance experiment to find a relationship between the luminance 1801 and the gain value 1802 of the shadow ideal for detecting the road surface marking.

Referring back to FIG. 7, in step 404 of writing rear camera gain value schedule data, the rear camera gain value schedule table (FIG. 8) determined in step 403 is written in rear camera gain value schedule data 406.

Figure 9:
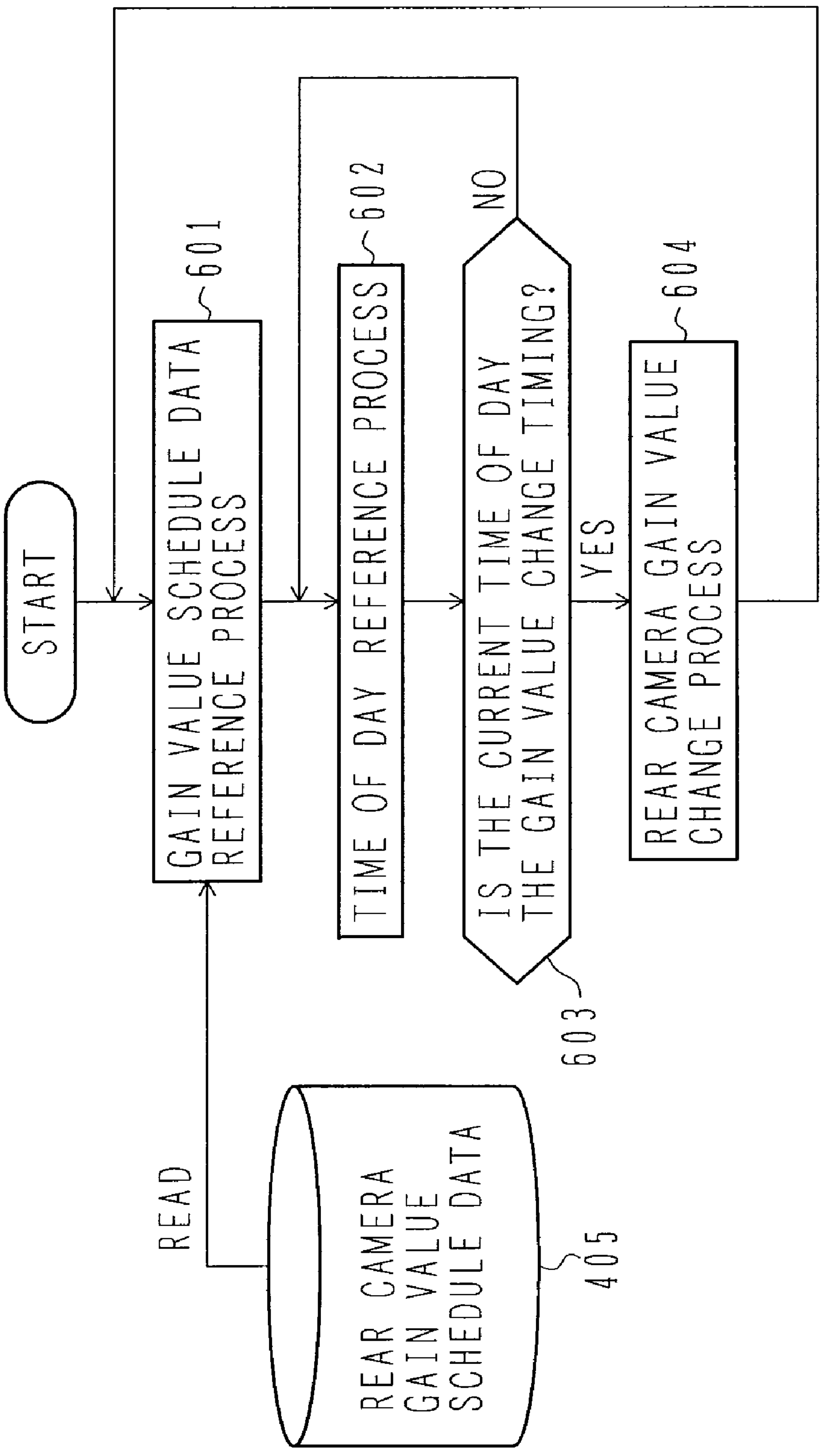
FIG. 9 is a flowchart showing processes executed by a rear camera control section of the rear camera image recognition function.

Processes shown in FIG. 9 are executed in the rear camera control section 107. In step 601 of performing a gain value schedule data reference process, the rear camera gain value schedule data 406 created in the step 302 of performing the rear camera gain value determination process executed by the recognition method evaluation section 104 is read at regular intervals.

A current time is next read in step 602 of performing a time reference process. In branch 603, if the current time is the gain value change time 501 described in the rear camera gain value schedule data 406, step 604 of performing a rear camera gain value change process is performed. In step 604, the gain value 502 described in the rear camera gain value schedule data 406 is transmitted to the camera control section of the rear camera 108. If the current time is not the gain value change time 501, the operation returns to step 601.

[Rear Camera Exposure Time Determination Process]

A detailed embodiment of step 307 of performing the rear camera exposure time determination process, among other steps (FIG. 3) executed at the recognition method evaluation section 104 shown in FIG. 2, will be described below with reference to FIGS. 28 to 30.

Processes in step 307 of performing the rear camera exposure time determination process among other steps (FIG. 3) executed at the recognition method evaluation section 104 will be described with reference to FIG. 28.

Figure 28:
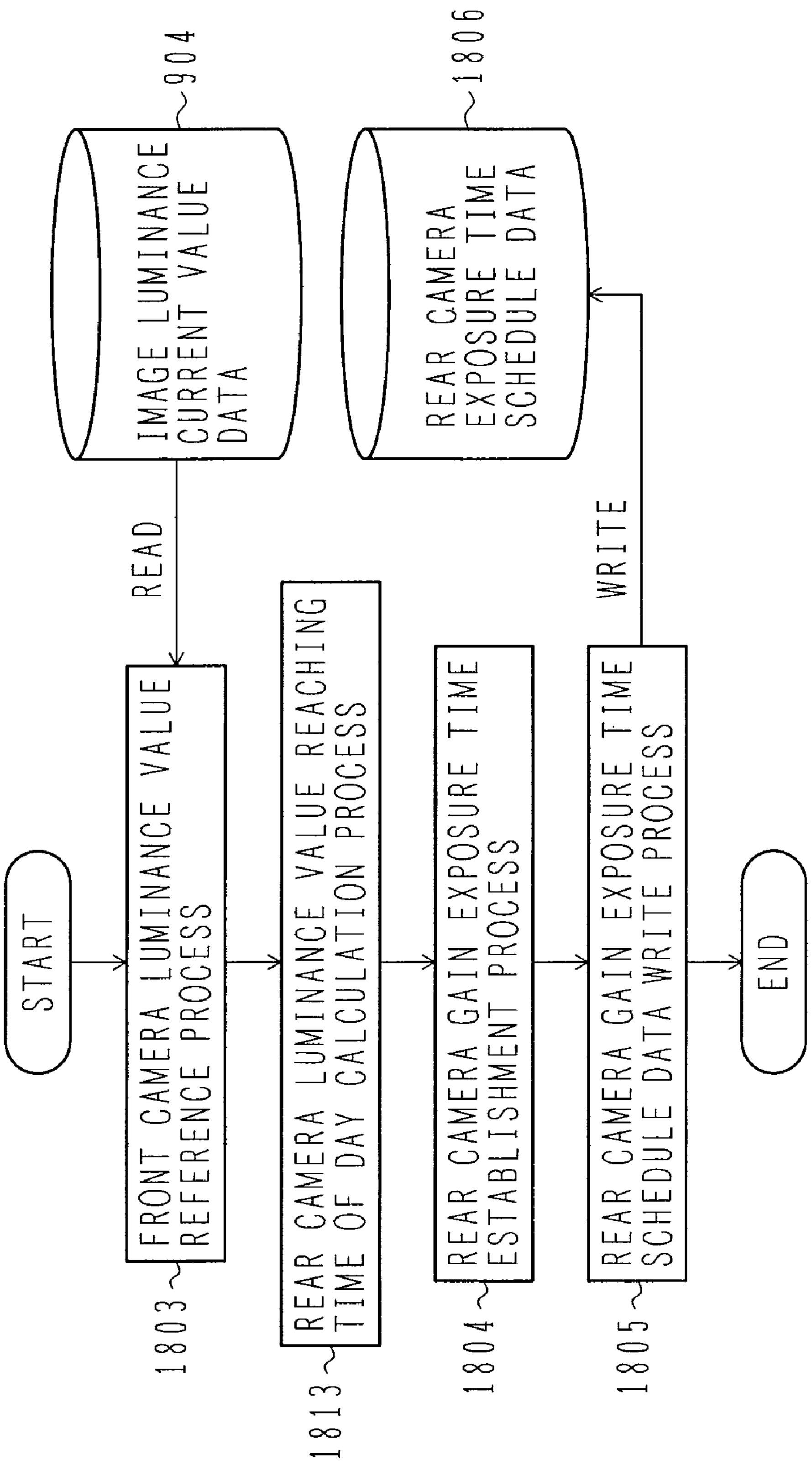
FIG. 28 is a flowchart showing the rear camera exposure time determination process as part of the recognition method evaluation function of the rear camera image recognition function.

FIG. 28 is a detailed flowchart showing step 307 of the rear camera exposure time determination process. In step 1803 of performing a front camera luminance value reference process, image luminance current value data 904 created by the front camera image recognition unit 102 is read to find a mean luminance value of the front camera input screen.

In step 1813 of performing a front camera luminance value reaching time calculation process, time T2 is calculated, at which an image of the average luminance value of the front camera 101 obtained in step 1803 appears within the field of view of the rear camera 108. To calculate it, the vehicle speed current value v1 and a current time T1 are referred to. Then, referring to FIGS. 25A and 25B, when d1 is the distance between the position at which the front camera 101 is installed and that at which the rear camera 108 is installed; F1, a y-coordinate value of an intersection point between the optical axis of the front camera 101 and the road surface; and R1, a y-coordinate value of an intersection point between the optical axis of the rear camera 108 and the road surface. Then, we have:

$$T2=T1+(F1+d1+R1)/v1$$

In step 1804 of performing a rear camera exposure time determination process, the exposure time for the rear camera 108 is established in accordance with the luminance value obtained in step 1803. A rear camera exposure time schedule table shown in FIG. 29 is thereby created. The table defines a time 1807 indicating a timing for changing an exposure time and an exposure time 1808 that is changed at the timing 1807. The exposure time 1808 is determined by the average luminance value expected within the field of view of the rear camera 108. The exposure time 1808 is determined by referring to a table of a luminance value 1814 and exposure time 1815 shown in FIG. 31. The exposure time 1815 enabling the road surface marking to be detected most easily according to the luminance value 1814 is determined through an advance experiment.

In step 1805 of writing a rear camera exposure time schedule data, the rear camera exposure time schedule (FIG. 29) established through steps 1813 and 1804 is written in rear camera exposure time schedule data 1806. The rear camera control section 107 of the rear camera image recognition unit 103 refers to the rear camera exposure time schedule data 1806.

Figure 30:
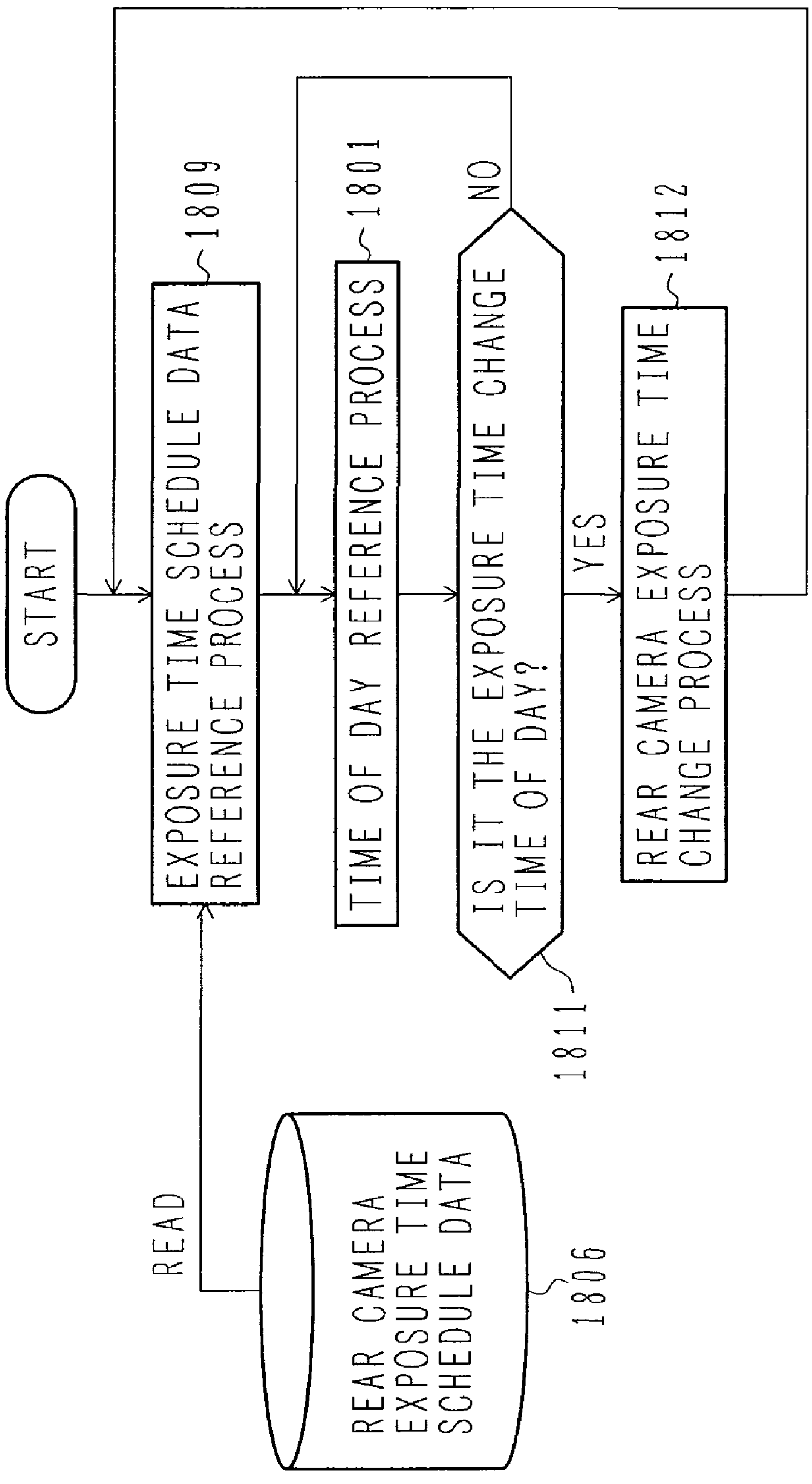
FIG. 30 is a flowchart showing processes performed by the rear camera control section of the rear camera image recognition function.

Processes shown in FIG. 30 are executed at the rear camera control section 107.

In step 1809 of performing an exposure time schedule data reference process, the rear camera exposure time schedule data 1806 created through step 307 of performing the rear camera exposure time determination process performed at the recognition method evaluation section 104 is read at regular intervals.

In step 1810 of performing a time reference process, the current time is read. In branch 1811, if the current time is the exposure time change time 1807 described in the rear camera exposure time schedule data 1806, step 1812 of performing a rear camera exposure time change process is performed. In step 1812, the exposure time 1808 described in the rear camera exposure time schedule data 1806 is transmitted to the camera control section of the rear camera 108. If the current time is not the exposure time change time 1807, the operation returns to step 1809.

[Rear Camera Object Recognition Determination Process]

A detailed embodiment of step 303 of performing the rear camera object to be recognized determination process, among other steps (FIG. 3) executed at the recognition method evaluation section 104, will be described below with reference to FIGS. 32 to 37.

Figure 32:
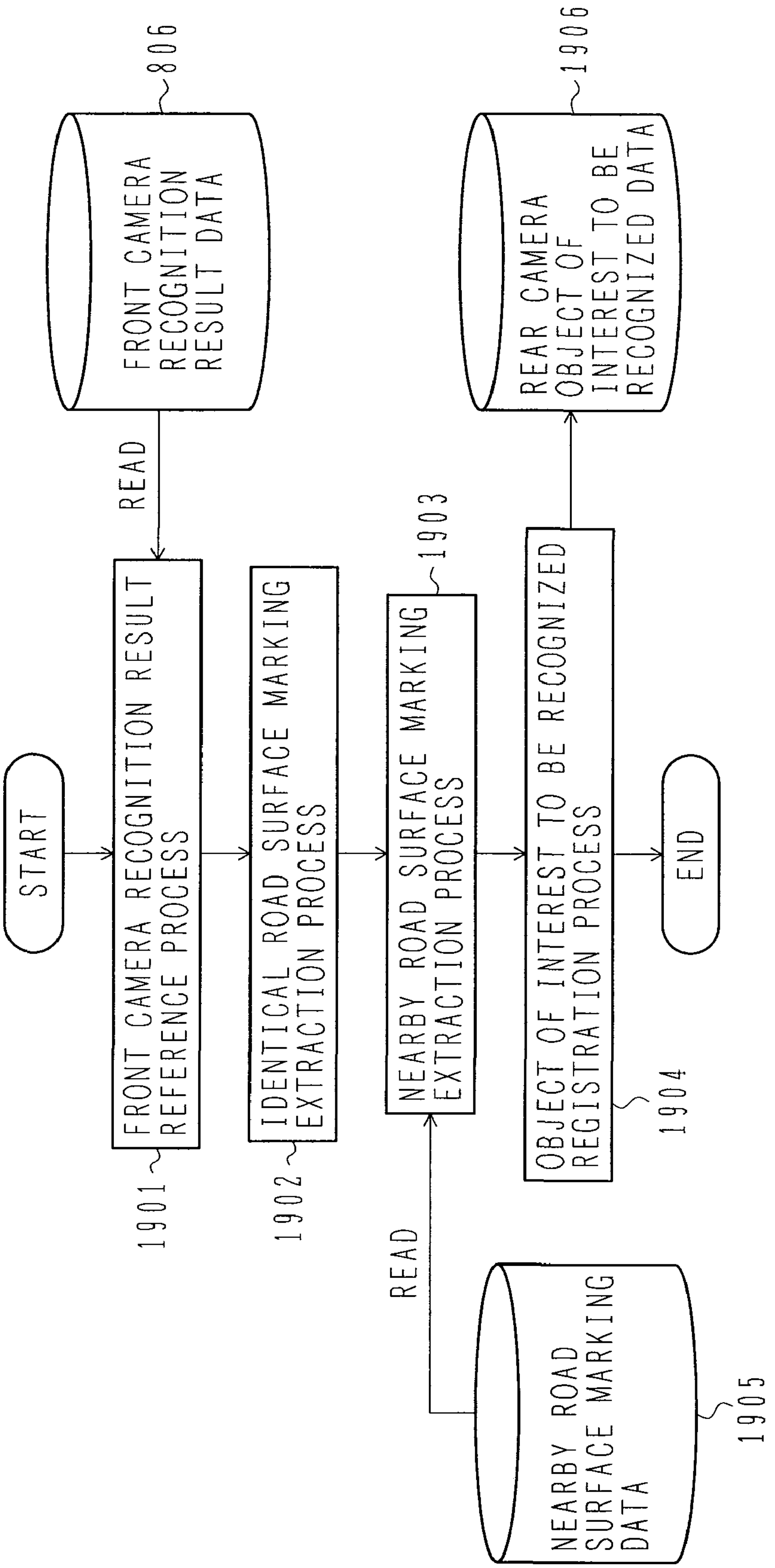
FIG. 32 is a flowchart showing a rear camera object recognition determination process as part of the recognition method evaluation function of the rear camera image recognition function.

FIG. 32 is a detailed flowchart showing step 303 of determining an object to be recognized by the rear camera.

Figure 33:
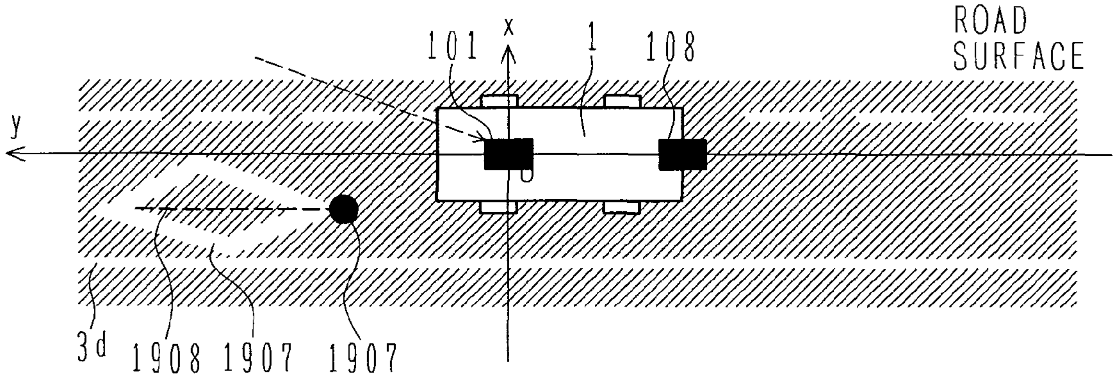
FIG. 33 is a view illustrating the position of an object recognized by the front camera and the angle of the object recognized relative to the vehicle.

In step 1901 of performing a front camera recognition result reference process, the front camera recognition result data 806, which describes the recognition results indicating the road surface marking recognized by the front camera image recognition unit 102, is read. The front camera recognition result data 806 is defined as a table shown in FIG. 36. The table stores an ID number 2101, a type 2102 of the road surface marking, white line, traffic light, and sign recognized, a time 2103 of recognition, a position 2104 of the object recognized, an angle 2105 of the object recognized relative to the vehicle, and a degree 2106 of fading in the paint of the road surface marking or white line recognized. The position 2104 of the object recognized and the angle 2105 of the object recognized relative to the vehicle are represented as shown in FIG. 33. FIG. 33 is the road coordinate system described with reference to FIG. 22. In FIG. 33, the position 2104 of the object recognized (in the example shown in FIG. 33, the object recognized is a sign indicating a pedestrian crossing ahead, with a bicycle crossing lane) is represented by an x-coordinate value and a y-coordinate value of a point 1907 in the object recognized closest to the vehicle. The angle 2105 of the object recognized relative to the vehicle is represented by an angle formed between the y-axis and a line segment 1908 which is defined as a centerline 1908 of the object recognized extending in parallel with a white line 1910.

Figure 34:
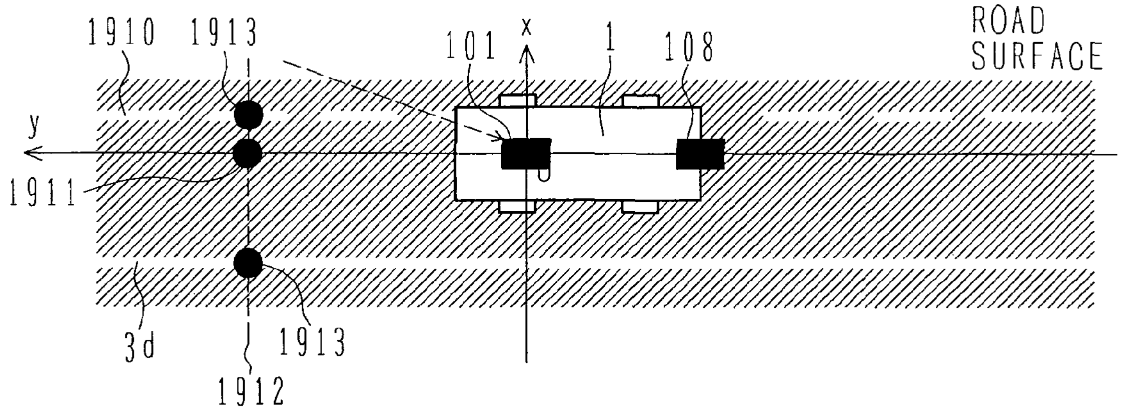
FIG. 34 is a view illustrating the position of a white line recognized by the front camera and the angle of the white line relative to the vehicle.

Of the front camera recognition result data 806, the position 2104 of the white line and the angle 2106 of the white line relative to the vehicle are represented as shown in FIG. 34. FIG. 34 is the road coordinate system described with reference to FIG. 22. Referring to FIG. 34, reference numeral 1 denotes the vehicle, reference numeral 101 denotes the front camera, and reference numerals 3*d*, 3*e* denote white lines recognized. In FIG. 34, a point 1911 on the y-axis is defined. The point 1911 is a distance of d2 ahead of the front camera.

Further, when a point 1913 is an intersection point between a straight line 1912 that passes through the point 1911 and extends on the road surface orthogonally to the y-axis and the white line, the position 2104 of the white line is given by the x-coordinate and y-coordinate values of the point 1913. Further, the angle 2106 of the white line relative to the vehicle is given by an angle formed between the white line and the y-axis.

How the front camera recognition result data 806 is created will be described later.

In step 1902 of performing an identical road surface marking extraction process, data concerning the type of road surface marking and the white line as objects of interest to be recognized by the rear camera 108 (FIG. 36) is extracted from among the front camera recognition result data 806 recognized by the front camera image recognition unit 102. The extracted data serves as the objects of interest to be recognized by the rear camera 108.

In step 1903 of performing a nearby road surface marking extraction process, the road surface markings located nearby the object recognized are extracted as the objects of interest to be recognized by the rear camera 108 from among the front camera recognition result data 806 recognized by the front camera image recognition unit 102. For the nearby road surface markings, nearby road surface marking data 1905 shown in FIG. 32 is previously registered and the nearby road surface markings are extracted from the nearby road surface marking data 1905.

A table shown in FIG. 35 shows a type 2001 of road surface markings, traffic lights, and signs to be recognized by the front camera 101, a type 2002 of road surface markings located nearby the type 2001, and an assumed distance 2003 between the type 2001 and the type 2002.

In step 1904 of registering an object to be recognized, the types of road surface markings defined as the objects of interest to be recognized by the rear camera 108 in steps 1902 and 1903 are written in the data 1906 on an object to be recognized by the rear camera. The data 1906 on the object to be recognized by the rear camera is a table shown in FIG. 37. The table of FIG. 37 stores the following types of data: an ID number 2201 of the object to be recognized; a type 2202 of the object to be recognized; an estimated time 2203 of appearance within the field of view of the rear camera 108; an estimated position 2204 of the object to be recognized appearing within the field of view of the rear camera 108; an estimated angle 2205 of the object to be recognized relative to the vehicle; and a degree 2206 of fading of paint of the road surface marking to be recognized.

Step 1904 of registering the object to be recognized involves registration of the ID number 2201, the type 2202, and the degree 2206 of fading of paint among other data 1906 on an object to be recognized by the rear camera. The rest of the data 1906 on the object to be recognized by the rear camera is registered later and thus yet to be registered in this step 1904 of registering the object to be recognized. The ID number 2201 and the degree 2206 of fading of paint, if extracted in step 1902 of performing the identical road surface marking extraction process, are identical to the ID number 2101 and the degree 2106 of fading of paint of the front camera recognition result data 806. If extracted in step 1903 of performing the nearby road surface marking extraction process, the ID number 2201 is to be newly registered and the degree 2206 of fading is yet to be registered in the step 1904 of registering an object to be recognized.

[Rear Camera Process Timing Determination Process]

Figure 38:
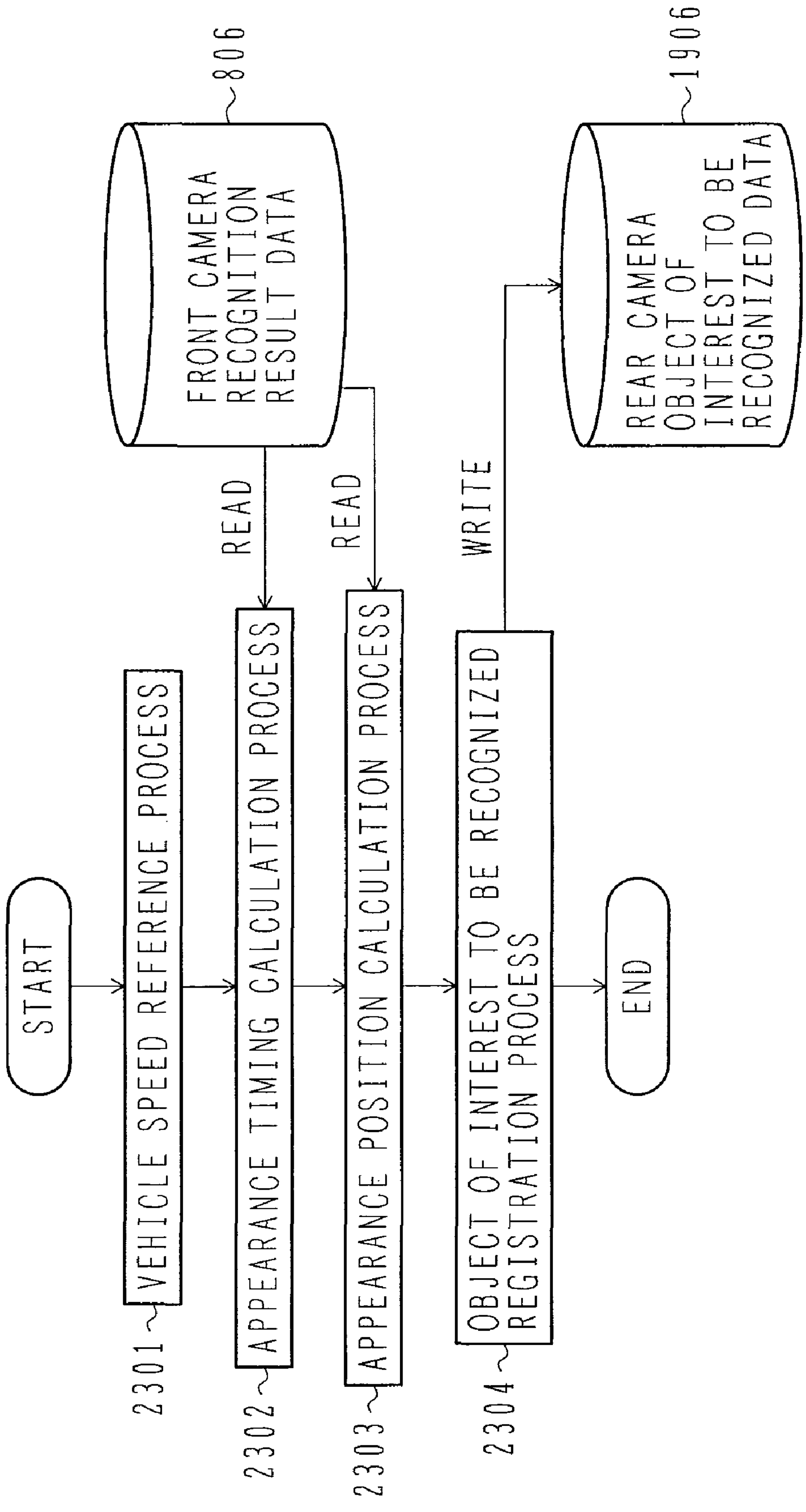
FIG. 38 is a flowchart showing a rear camera process timing determination process as part of the recognition method evaluation function of the rear camera image recognition function.

A detailed embodiment of step 304 of performing the rear camera process timing determination process, among other steps (FIG. 3) executed at the recognition method evaluation section 104, will be described below with reference to FIGS. 38 to 41. FIG. 38 is a detailed flowchart showing step 304 of performing the rear camera process timing determination process.

In step 2301 of performing a vehicle speed reference process, the vehicle speed current value v1 is obtained.

In step 2302 of performing an appearance timing calculation process, timing is calculated at which the object to be recognized appears at the starting end 1602 of the road surface marking recognition area shown in FIG. 25A. Referring to FIGS. 25A and 25B, when s1 is a y-coordinate value of the starting end 1602 of the road surface marking recognition area in the road coordinate system; a3, a y-coordinate value (2104 of FIG. 36) of the object of interest detected by the front camera image recognition unit 102 in the road coordinate system; t3 (2103 of FIG. 36), a time at which the object of interest is detected by the front camera image recognition unit 102; and d1, the distance between the position at which the front camera 101 is installed and that at which the rear camera 108 is installed, a time t4, at which the object detected by the front camera image recognition unit 102 appears at the starting end 1602 of the road surface marking recognition area, is given by the following equation:

$$t4=t3+(a3+d1+|s1|)/v1 \qquad \text{(FIG. 41)}$$

Figure 39:
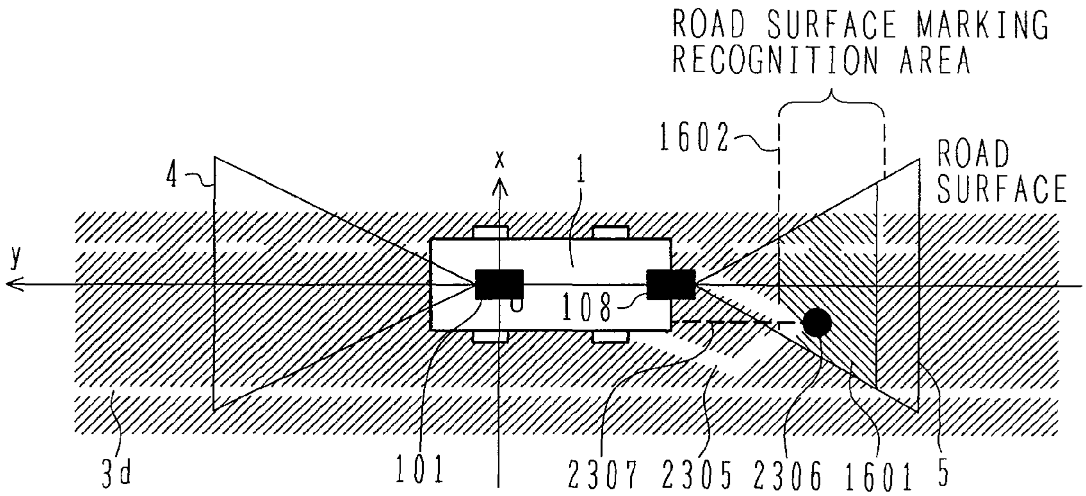
FIG. 39 is a view defining the position of an object to be recognized by the rear camera and the angle of the same relative to the vehicle.

In step 2303 of performing an appearance position calculation process, a specific position within the field of view of the rear camera 108 is calculated at which the object to be recognized appears. FIG. 39 is a view defining the position of the object to be recognized by the rear camera 108 and the angle of the same relative to the vehicle. FIG. 39 represents the road coordinate system described in FIG. 22, in which reference numeral 1 denotes a vehicle, reference numeral 108 denotes a rear camera, reference numeral 5 denotes a field of view of the rear camera 108, reference numeral 1601 denotes a road surface marking recognition area, and reference numeral 1602 denotes a starting end of the road surface marking recognition area 1601. The position (x2, y2), at which an object 2306 to be recognized appears, is where a point 2306 measured to determine the position of the object 2306 to be recognized appears at the starting end 1602 (the y-coordinate value being s1) of the road surface marking recognition area. The angle of the object 2306 to be recognized relative to the vehicle is an angle r2 formed between a line segment 2307, which is defined as a centerline 2307 of the object 2306 to be recognized extending in parallel with a white line, and the y-axis. Assume that the position (2104 of FIG. 36) of the object to be recognized of the front camera recognition result data 806 is (x1, y1), the angle 2105 relative to the vehicle is r1, and the distance between the position at which the front camera 101 is installed and that at which the rear camera 108 is installed is d1. It is further assumed that the road is straight and the vehicle has a steering angle of 0. Then, we have:

$x2=x1\pm(y1+d1+|s1|)*\tan(r1)$ (positive or negative is selected for the sign ± according to whether r1 is positive or negative)

$y2=s1$ $r2=r1$

Figure 40:
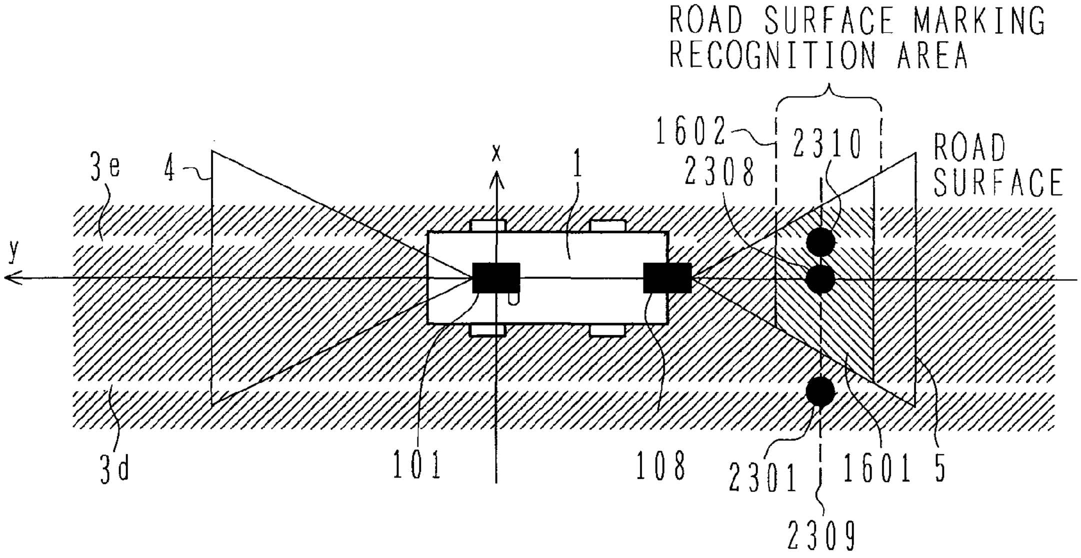
FIG. 40 is a view illustrating the position of a white line and the angle thereof relative to the vehicle.
Figure 41:
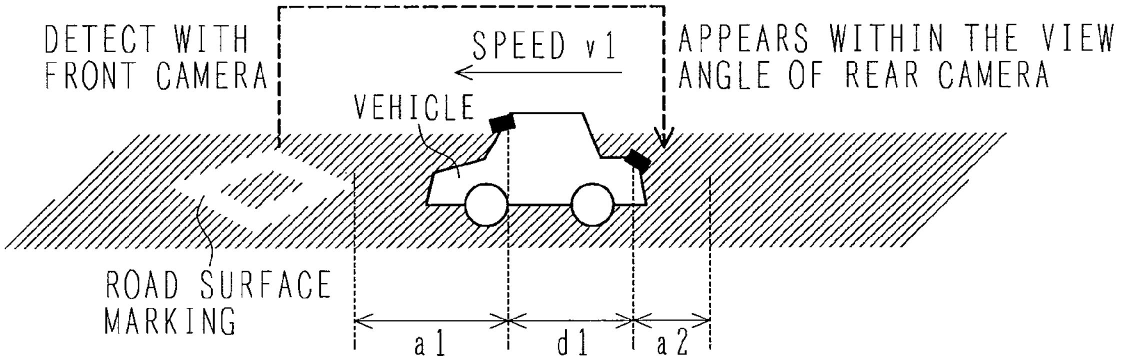
FIG. 41 is a view showing a positional relationship among a field of view of the front camera, a field of view of the rear camera, and the vehicle.

If the object to be recognized is a white line, the position and the angle relative to the vehicle are defined as shown in FIG. 40 and the position of appearance within the field of view of the rear camera is calculated. FIG. 40 is the road coordinate system described in FIG. 22, in which reference numeral 1 denotes a vehicle, reference numeral 108 denotes a rear camera, reference numeral 5 denotes a field of view of the rear camera 108, reference numeral 1601 denotes the road surface marking recognition area described with reference to FIG. 16, and reference numeral 1602 denotes a starting end of the road surface marking recognition area 1601. Further, a point 2308 is defined on the y-axis and at a distance of d3 rearward of the rear camera 108. Herein, let reference numeral 2307 be an intersection point between a straight line 2309 on the road surface passing through the point 2308 and extending orthogonally to the y-axis and a white line 2307. Then, the position of the white line (x4, y4) is the x-coordinate and y-coordinate values of the intersection point 2310. An angle r4 of the white line relative to the vehicle is expressed by an angle formed between the white line and the y-axis. Assume that the position (2104 of FIG. 36) of the object to be recognized (white line) of the front camera recognition result data 806 is (x3, y3), the angle 2105 relative to the vehicle is r3, and the distance between the position at which the front camera 101 is installed and that at which the rear camera 108 is installed is d1. It is further assumed that the road is straight and the vehicle has a steering angle of 0. Then, we have:

$x4=x3\pm(y3+d1+d3)*\tan(r3)$ (positive or negative is selected for the sign ± according to whether r3 is positive or negative)

$y4=-d1-d3$ $r4=r3$

Finally in step 2304 of registering an object to be recognized, the timing of the object to be recognized appearing within the field of view of the rear camera calculated in step 2302 and the position of the object to be recognized appearing within the field of view of the rear camera calculated in step 2303 are written in the time 2203 of appearance, the position 2204, and the angle 2205 of the table (FIG. 37) of the data 1906 on the object to be recognized by the rear camera. If the object to be recognized is a white line, the time 2203 of appearance is the current time.

If the object to be recognized is extracted in step 1903 of performing a nearby road surface marking extraction process, the time 2203 of appearance is as follows. Specifically, the timing is calculated at which the front camera object to be recognized (2001 of FIG. 35) appears within the field of view of the rear camera. The time 2203 of appearance should allow for the assumed distance (2003 of FIG. 35) between the front camera object to be recognized (2001 of FIG. 35) and the nearby road surface marking type (2002 of FIG. 35). The position 2204 and the angle 2206 are to be yet to be registered.

[Rear Camera Recognition Logic Parameter Establishment Process]

Figure 42:
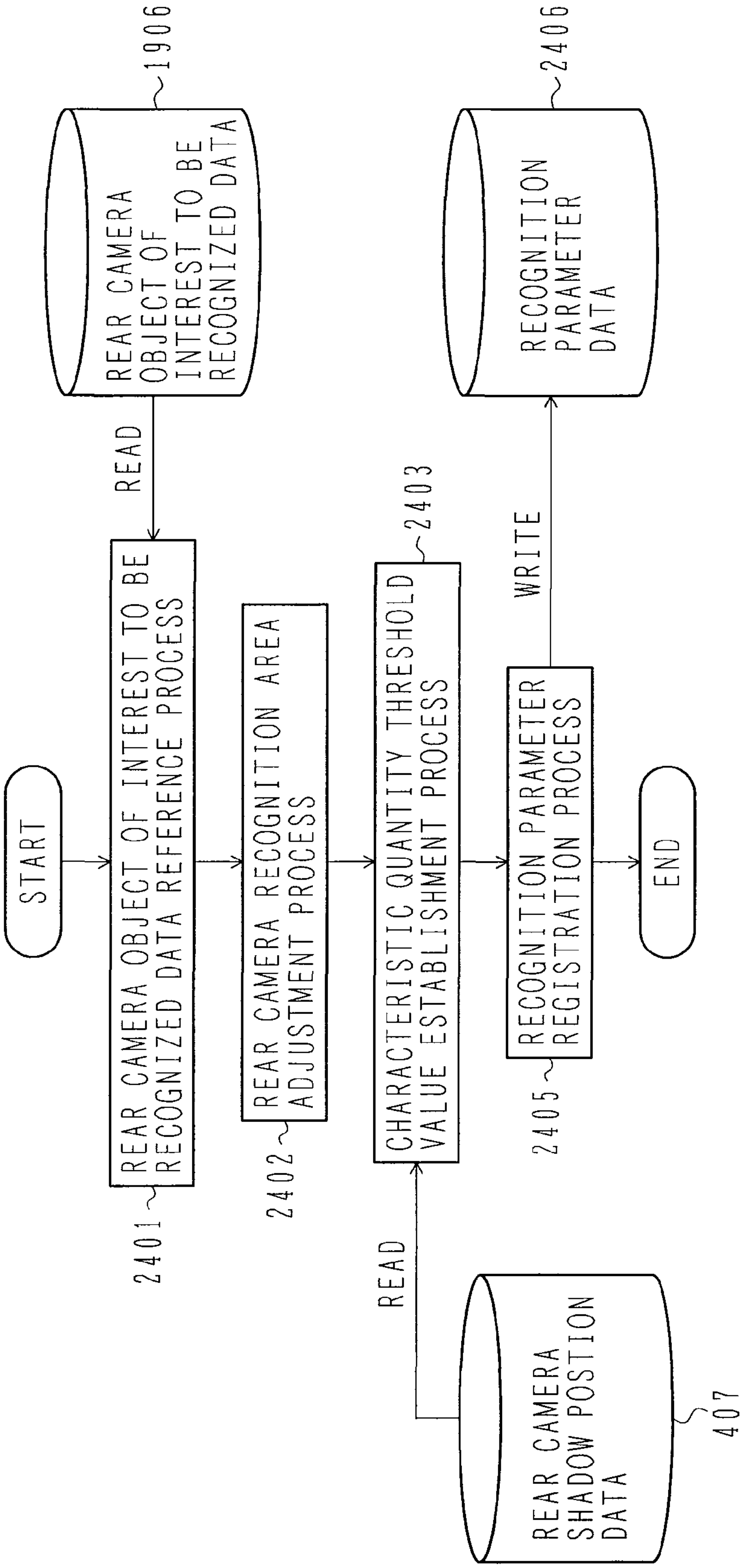
FIG. 42 is a flowchart showing a rear camera recognition logic parameter determination process as part of the recognition method evaluation function of the rear camera image recognition function.

A detailed embodiment of step 305 of performing the rear camera recognition logic parameter determination process, among other steps (FIG. 3) executed at the recognition method evaluation section 104, will be described below with reference to FIGS. 42 to 47. FIG. 42 is a detailed flowchart showing step 305 of performing the rear camera recognition logic parameter determination process.

In step 2401 of referencing data on an object to be recognized by the rear camera, contents (table of FIG. 37) registered in the data 1906 on the object to be recognized by the rear camera are read.

Figures 43, 44:
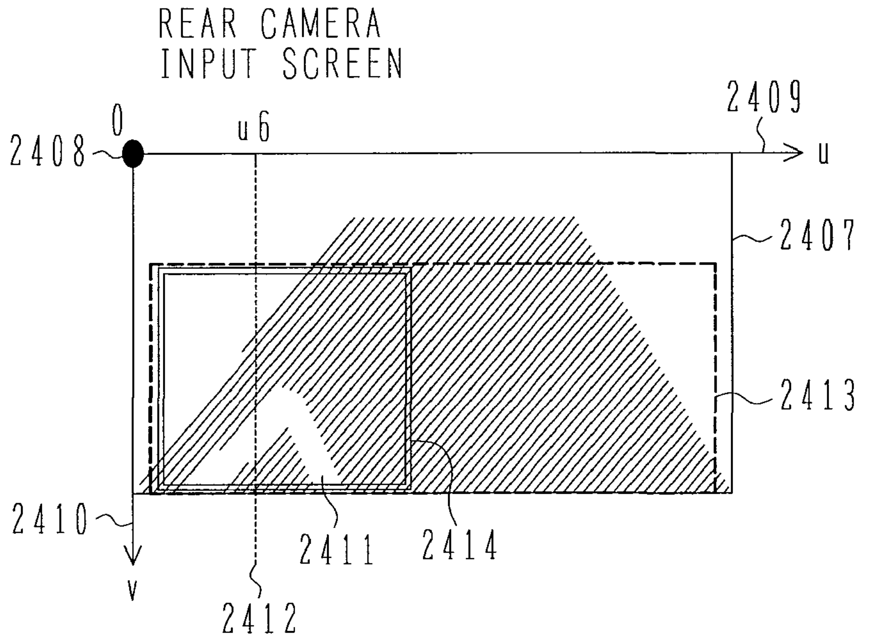
FIG. 43 is a view illustrating adjustment of the rear camera recognition area.
FIG. 44 shows a conversion table for conversion between the road coordinate system and the rear camera screen coordinate system.

In subsequent step 2402 of performing a rear camera recognition area adjustment process, an x-coordinate value of the position (2204 of FIG. 37) of the data 1906 on the object to be recognized by the rear camera is converted to a corresponding value in a screen coordinate system. The screen coordinate system refers to a coordinate system having an origin O at an upper left corner 2408 of a rear camera input screen 2407, a u-axis extending in a width direction 2409 of the screen 2407, and a v-axis extending in a height direction 2410 of the screen 2407. In step 2402, a rear road surface marking appearance position 2412 (u6 of the u coordinate value) of an object 2411 to be recognized on the rear camera input screen 2407 is first calculated. An ordinary recognition area is indicated by a dotted line 2413. For the object 2411 that is to appear at the appearance position 2412, an area equivalent to width of the object to be recognized is corrected about the rear road surface marking appearance position 2412. Specifically, a recognition area 2414 of the object to be recognized after correction inside a solid line is corrected as the recognition area of the object to be recognized. A conversion table shown in FIG. 44 is prepared in advance for conversion from the road coordinate system to the screen coordinate system. The coordinate system conversion is made by referring to this table of FIG. 44. The table of FIG. 44 stores an x-coordinate value 2415 and a y-coordinate value 2416 in the road coordinate system, a u-coordinate value 2417 and a v-coordinate value 2418 in the screen coordinate system, the u-coordinate value 2417 and the v-coordinate value 2418 corresponding to the x-coordinate value 2415 and the y-coordinate value 2416.

In step 2403 of performing a characteristic quantity threshold value determination process, a threshold value for extraction of a characteristic quantity of the road surface marking is established by using the degree (2206 of FIG. 37) of fading of the data 1906 on the object to be recognized by the rear camera and the rear camera shadow position data 407 at the timing at which the object to be recognized appears within the field of view of the rear camera 108 (table of FIG. 26).

Figure 45:
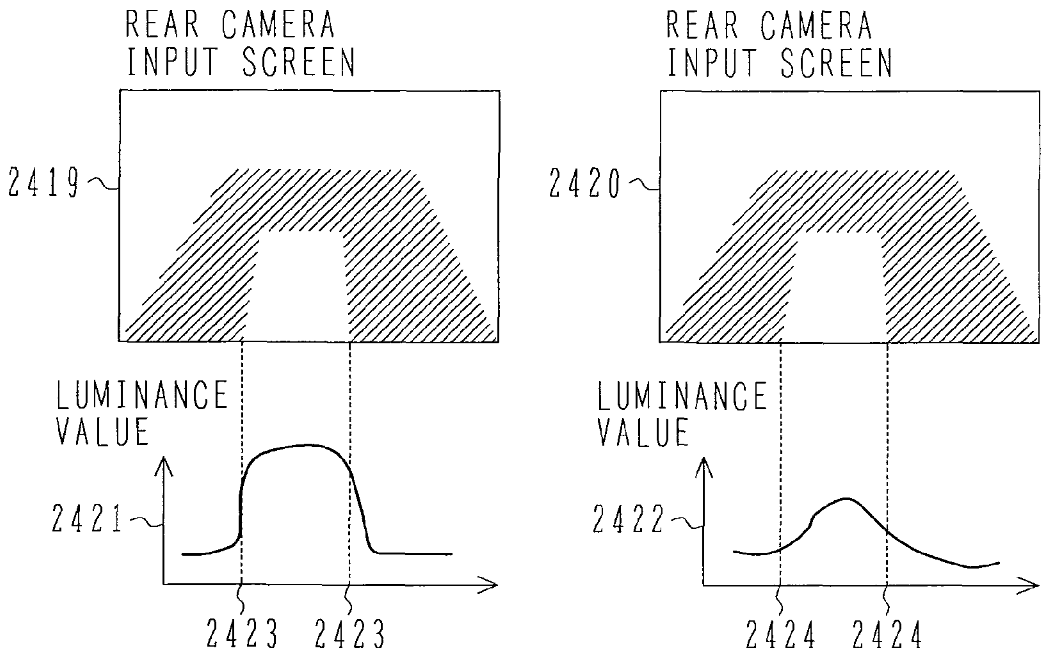
FIG. 45 is a view illustrating a method for determining a characteristic quantity extraction threshold value.

Methods for determining the degree of fading and the characteristic quantity extraction threshold value will be described with reference to FIG. 45. Referring to FIG. 45, reference numeral 2419 shows how the road surface marking is seen when the degree of fading is low. Reference numeral 2420 shows how the road surface marking is seen when the degree of fading is high. Reference numerals 2421, 2422 represent changes in the luminance value of the portion of the road surface marking. With a low degree of fading, an outline of the road surface marking portion is extracted on the assumption that the change in the luminance value of a portion 2423 is precipitous. For a high degree of fading, on the other hand, the outline of the road surface marking portion is extracted on the assumption that the change in the luminance value of a portion 2424 is moderate.

Figure 46:
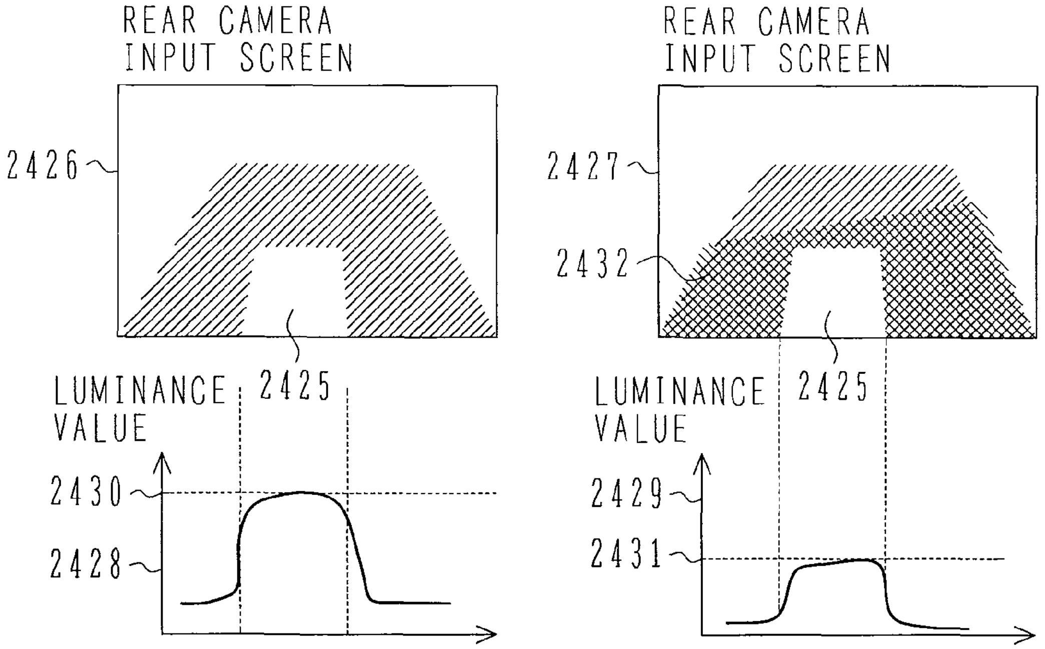
FIG. 46 is a view illustrating a method for determining the characteristic quantity extraction threshold value.

A method for determining the characteristic quantity extraction threshold value in accordance with presence of a shadow on the road surface at the timing, at which the object to be recognized appears within the field of view of the rear camera 108 will be described with reference to FIG. 46. The time at which the shadow starts and that at which the shadow ends (1704 of FIG. 26) of the rear camera shadow position data 407 are first referred to. The road surface marking is seen as 2425 if there is no shadow on the rear camera input screen at the time (2203 of FIG. 37), at which an object to be recognized 2425 appears in the recognition area. The road surface marking is seen as 2427 if there is a shadow 2432 on the rear camera input screen. Reference numerals 2428, 2429 represent changes in the luminance value of the portion of the road surface marking. With no shadows, the outline of the road surface marking portion is extracted on the assumption that the maximum of the luminance value of a portion 2430 is high. If there is a shadow, on the other hand, the outline of the road surface marking portion is extracted on the assumption that the maximum of the luminance value of a portion 2431 is low.

Finally in step 2405 of performing a recognition parameter registration process, the parameter values established through steps 2402 and 2403 are registered in the recognition parameter data 2406. The recognition parameter data 2406 is a table shown in FIG. 47. The table of FIG. 47 records: an ID number 2432 of the object to be recognized; a u-coordinate value 2433 on the left end of a rectangle of the recognition area (2414 of FIG. 43); a u-coordinate value 2434 on the right end of the rectangle of the recognition area (2414 of FIG. 43); an estimated value 2435 (2423, 2424 of FIG. 45) of changes in the luminance value between the road surface and the road surface marking; and an estimated value 2436 (2430, 2431 of FIG. 46) of the maximum of the luminance value of the road surface marking portion. The ID number 2432 corresponds to the ID number (2201 of FIG. 37) of the data 1906 on the object to be recognized by the rear camera.

Figure 11:
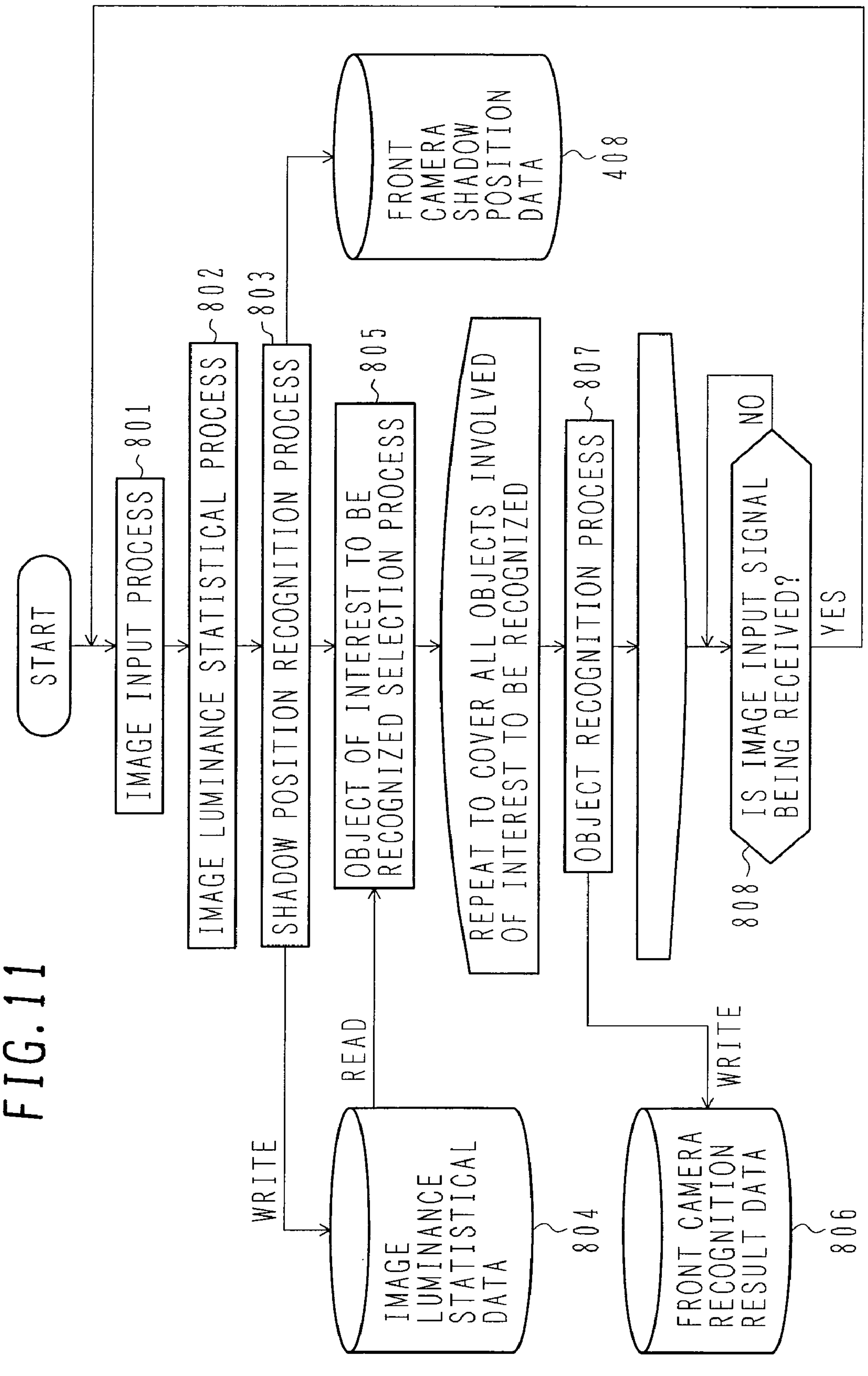
FIG. 11 is a flowchart showing the processes performed by a front image recognition function.

Processes performed by the front road surface marking recognition section 102*a* will be described below with reference to FIG. 11. FIG. 11 is a flowchart showing the processes performed by the front road surface marking recognition section 102*a*.

In step 801 of performing an image input process, the image taken by the front camera 101 is obtained.

In step 802 of performing an image luminance statistical process, statistical data of the luminance value of the input image is accumulated and analyzed, and written in image luminance statistical data 804. Step 802 will be described in detail later.

In step 803 of performing a shadow position recognition process, it is determined whether or not there is a shadow on the road surface of the input screen. Results of the determination are written in the front camera shadow position data 408. Step 803 will be described in detail later.

In step 805 of selecting an object to be recognized, the type of the object to be recognized is selected. Step 807 to be described below is performed to recognize each of the objects of interest to be recognized. The object to be recognized is selected by the vehicle control apparatus 106*a*, the onboard information apparatus 106*b*, or the front camera image recognition unit 102.

In step 807 of performing an object recognition process, a process is performed for detecting the object to be recognized selected in step 805. Details of this process will be described later.

Finally in branch 807, if no new image input signal is received, the operation is set into a wait state. If a new image input signal is received in branch 807, the operation returns to step 801.

[Image Luminance Statistical Process]

Figure 12:
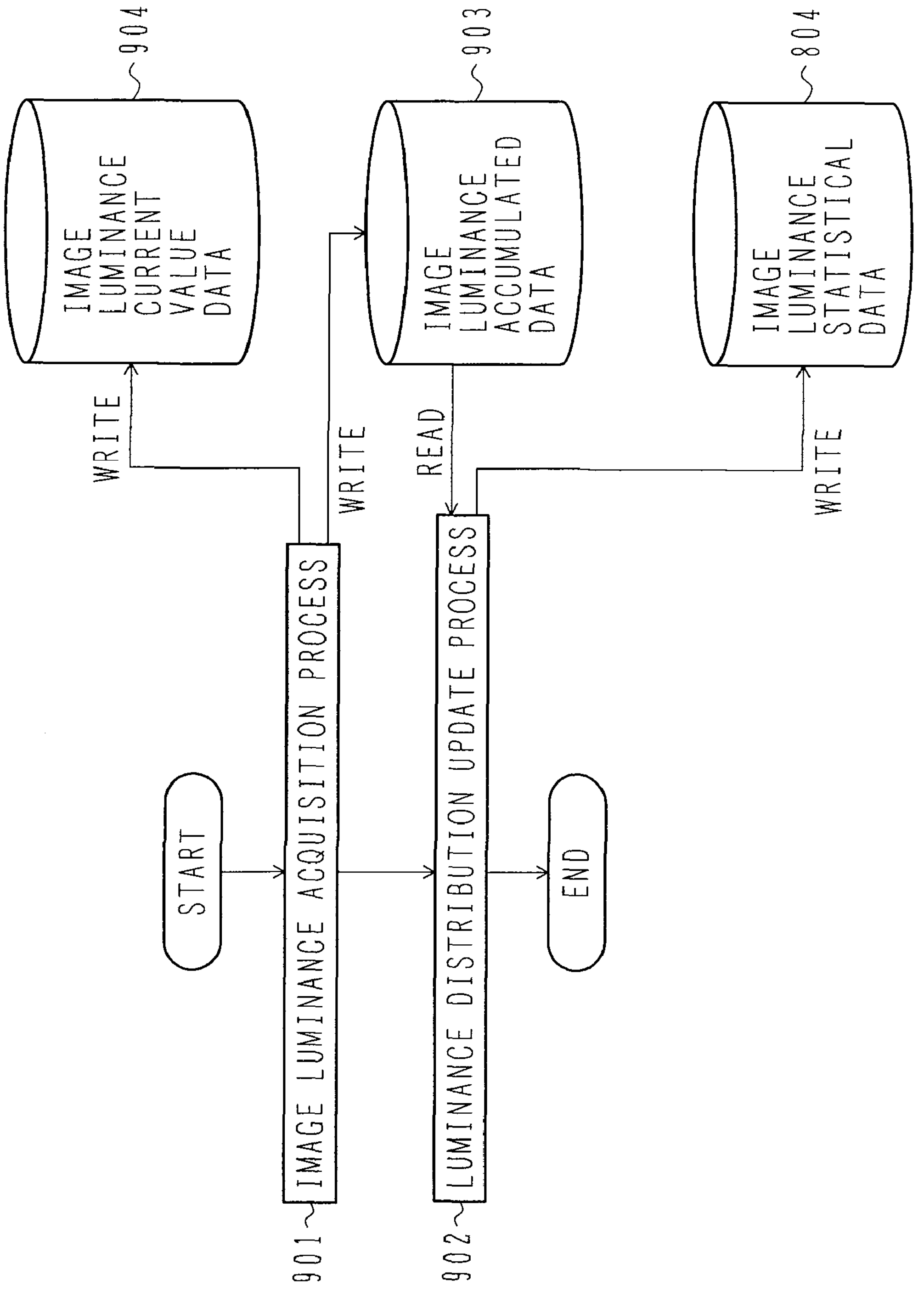
FIG. 12 is a flowchart showing processes performed in an image luminance statistical process of the front camera image recognition function.

Step 802 of performing the image luminance statistical process, among other steps (FIG. 11) performed by the front road surface marking recognition section 102*a*, will be described in detail below with reference to FIGS. 12 to 18. FIG. 12 is a flowchart showing processes performed in step 802 of performing the image luminance statistical process.

Figure 13:
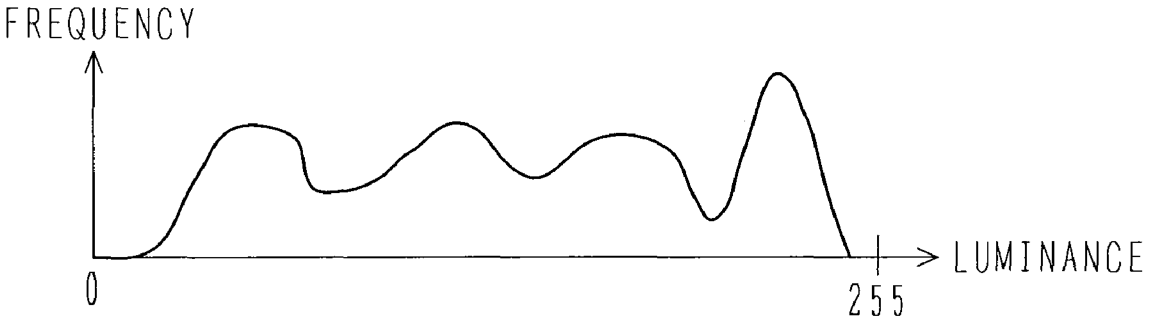
FIG. 13 is a view showing image luminance accumulated data.
Figures 14, 15:
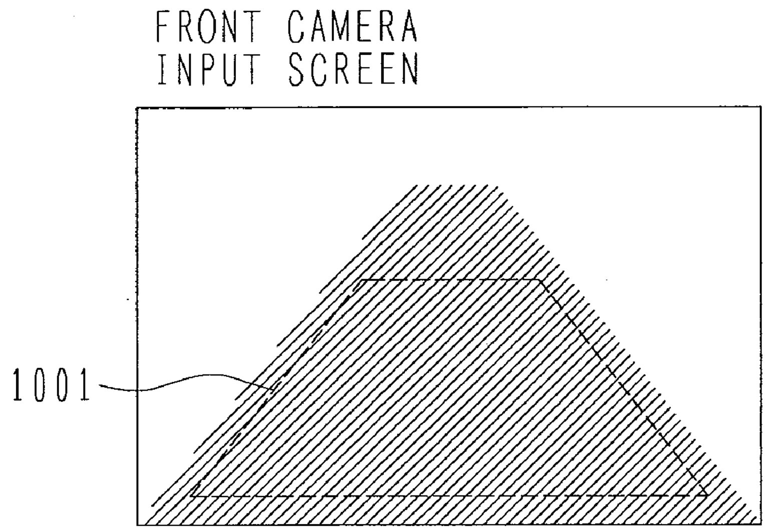
FIG. 14 is a view illustrating a method for acquiring image luminance.
FIG. 15 shows an image luminance statistical table.

In step 901 of performing an image luminance acquisition process, the luminance value of the input image is obtained and written in image luminance current value data 904 and image luminance accumulated data 903. Referring to FIG. 14, when the luminance value of the input image is to be acquired, a distribution of the luminance values of an area 1001 including the road surface is acquired as a distribution of luminance and frequency as shown in FIG. 13. The data is accumulated in the image luminance accumulated data 903.

In step 902 of performing a luminance distribution update process, the image luminance accumulated data 903 acquired and updated in step 901 is loaded, and an image luminance statistical table as shown in FIG. 15 is created and written in the image luminance statistical data 804. Referring to FIG. 15, reference numeral 1002 denotes the luminance of the image and reference numeral 1003 indicates the condition of the road surface under the corresponding luminance. The states of the road surface includes a state 1004 where there is a shadow on the road surface, a state 1005 where there is a shadow on a white road surface marking, a state 1006 where there is no shadow on the road surface, and a state 1007 where there is no shadow on the white road surface marking.

Figure 16:
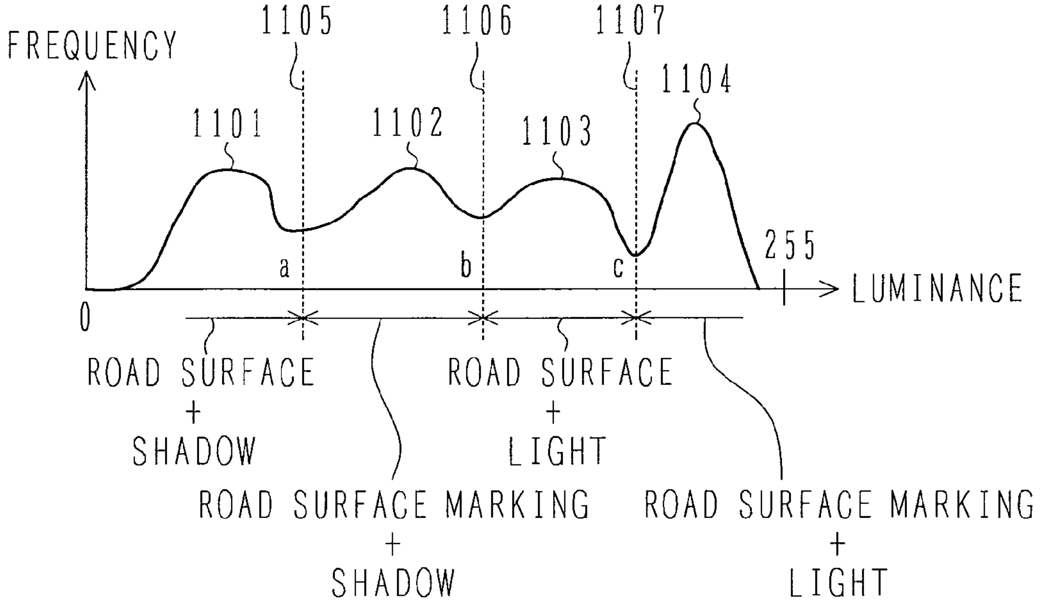
FIG. 16 is a view illustrating a method for determining a road surface condition.

The condition of the road surface is evaluated as follows. Specifically, if the distribution of luminance frequency has four peaks (1101 to 1104) as shown in FIG. 16 in the image luminance accumulated data 903 loaded in step 902, it is determined that there is a portion having a shadow and a portion not having a shadow on the road surface (typically in the daytime with sunshine). Spots (1105 to 1107) having the lowest frequency of luminance are extracted between each pair of adjacent peaks. The image luminance statistical table shown in FIG. 15 is then created with luminance values (a, b, c) at corresponding spots used as boundaries.

Figure 17:
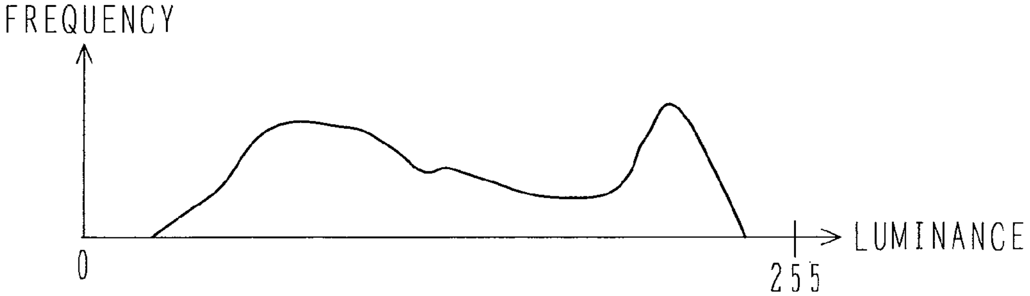
FIG. 17 is a view illustrating a method for determining a road surface condition.

Further, referring to FIG. 17, if four peaks are not formed in the distribution of luminance frequency in the image luminance accumulated data 903, it is determined that no sunshine is available even in the daytime, or it is nighttime. The image luminance statistical table as shown in FIG. 15 is then unknown.

[Shadow Position Recognition Process]

Figure 19:
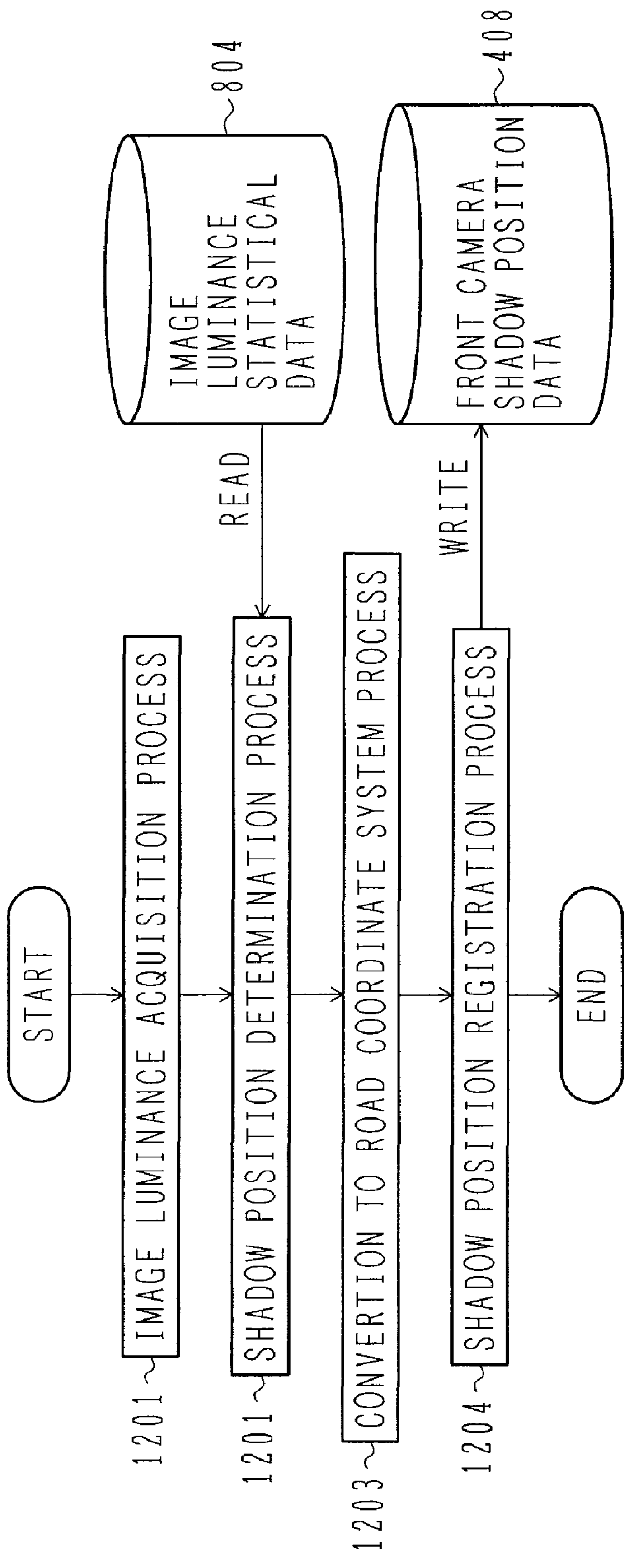
FIG. 19 is a flowchart showing processes performed in a shadow position recognition process of the front camera image recognition function.
Figure 20:
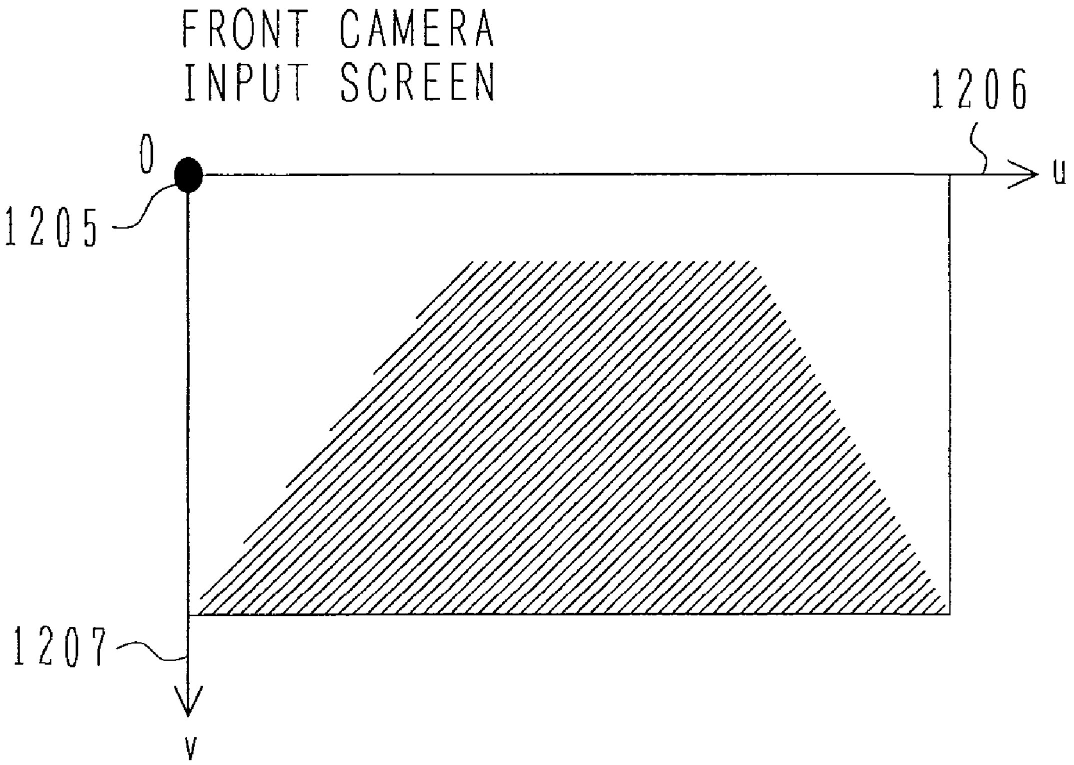
FIG. 20 is a view illustrating an image coordinate system of the front camera.

Step 803 of performing the shadow position recognition process, among other steps (FIG. 11) performed by the front road surface marking recognition section 102*a*, will be described in detail below with reference to FIGS. 19 to 21. FIG. 19 is a flowchart showing processes performed in step 803 of performing the shadow position recognition process.

In step 1201 of performing an image luminance acquisition process, the front camera input screen is divided into a plurality of small areas 1108 and a mean luminance in each area 1108 is calculated.

Figure 18:
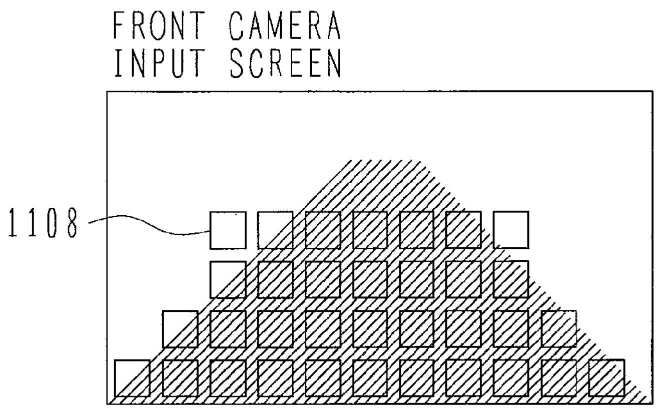
FIG. 18 is a view illustrating a method for acquiring image luminance.

In subsequent step 1202 of performing a shadow position determination process, the image luminance statistical data 804 created in step 802 of performing the image luminance statistical process is loaded. A comparison is then made between the mean luminance of each area 1108 of FIG. 18 acquired in step 1201 and the luminance value (1002 of FIG. 15) of the image luminance statistical table of the image luminance statistical data 804. A specific area or areas of the front camera input screen of FIG. 18 are thereby determined to be a shadow and the shadow start position 701 and the shadow end position 702 of FIG. 10 are extracted.

In step 1203 of performing conversion to road coordinate system, the shadow start position 701 and the shadow end position 702 extracted in step 1202 are translated to corresponding values in the road coordinate system. The shadow start position 701 and the shadow end position 702 extracted in step 1202 are in the screen coordinate system. Specifically, referring to FIG. 20, the screen coordinate system has an origin O at an upper left corner 1205 of the front camera input screen, a u-axis extending in a width direction 1206 of the screen, and a v-axis extending in a height direction 1207 of the screen. The road coordinate system is, on the other hand, a coordinate system shown in FIG. 22 as described earlier. Conversion from the screen coordinate system to the road coordinate system is made by referring to a conversion table shown in FIG. 21 prepared in advance. Referring to FIG. 21, reference numeral 1208 denotes a u-coordinate value and reference numeral 1209 denotes a v-coordinate value, respectively, in the screen coordinate system. These values are keyed to an x-coordinate value 1210 and a y-coordinate value 1211, respectively, in the road coordinate system.

Finally in step 1204 of performing a shadow position registration process, the shadow start position 701 and the shadow end position 702, which have been translated to the corresponding values in the road coordinate system in step 1203, are written in the front camera shadow position data 408. The front camera shadow position data 408 is in a form of a table shown in FIG. 23 as described earlier. The coordinate values translated in step 1203 are registered in the position 1403 and the luminance values of portions of no road surface markings are registered in the luminance mean value 1404.

[Object of Interest Recognition Process]

Step 807 of performing the object recognition process, among other steps (FIG. 11) performed by the front road surface marking recognition section 102*a*, will be described in detail below. If the object to be recognized selected in step 805 is a road surface marking or a white line, the same steps as those from 202 to 206 of a road surface marking recognition function 106 performed by the rear camera 108 shown in FIG. 3 are performed. During this time, in step 203 of performing the road surface marking characteristic quantity extraction process as shown in FIG. 3, the recognition parameter data 2406 is not loaded. If the object to be recognized selected in step 805 is a traffic light, a rectangular outline of the traffic light is detected through pattern matching in the input screen. Three circular shapes are then detected within the detected rectangle through pattern matching. Next, color information in the circular shape detected is obtained. If the color information obtained corresponds to any of red, yellow, and blue, it is then determined that the object is the traffic light.

If the object to be recognized selected in step 805 is a sign, pattern matching is performed to detect the shape of the sign to be recognized. Pattern matching is then performed for characters marked on the sign detected. If there is a match in the characters on the sign, it is then determined that the sign detected is one of the objects of interest to be recognized.

Other embodiments will be described below with reference to FIGS. 48 through 52.

Second Embodiment

Figure 48:
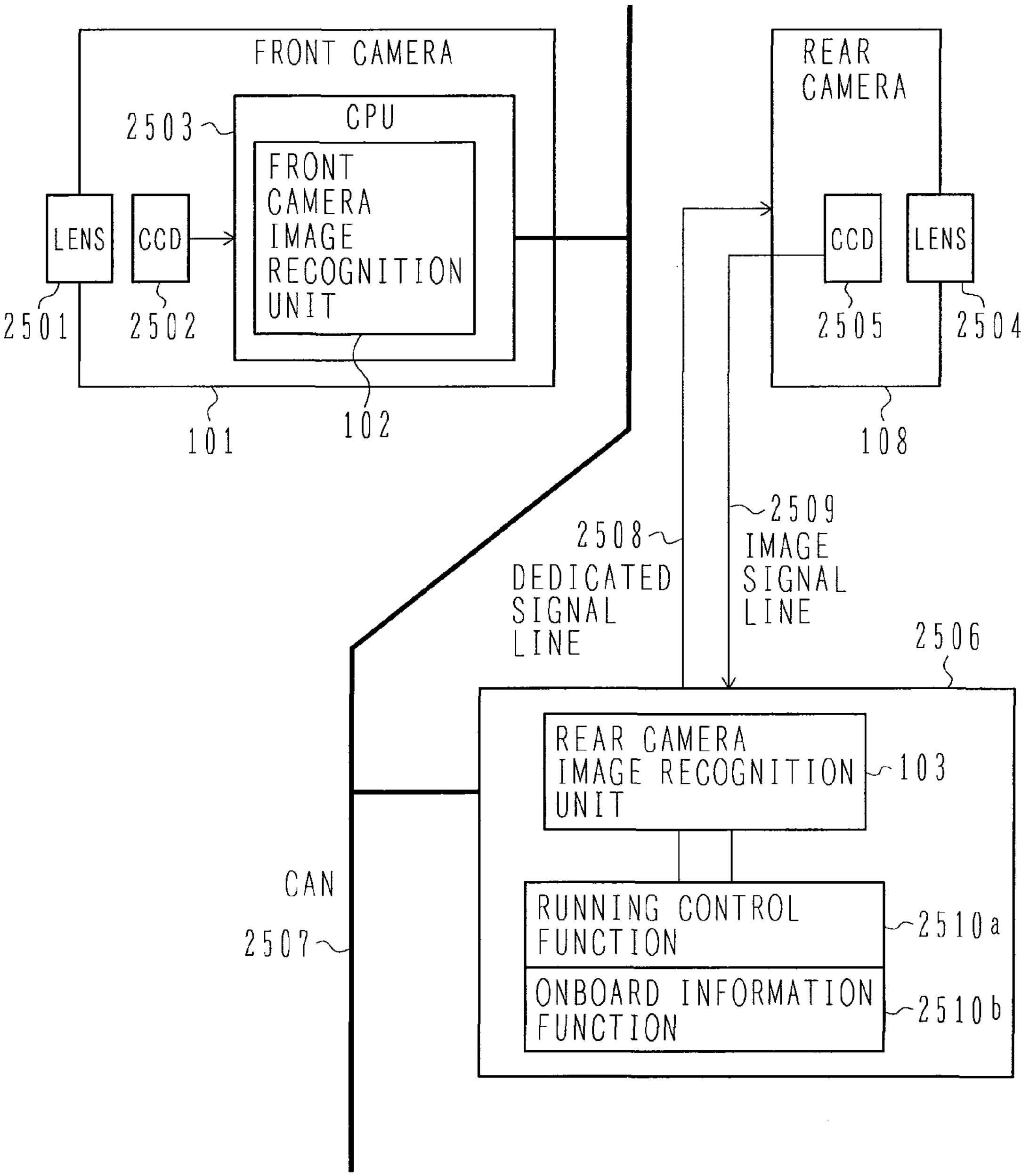
FIG. 48 shows a block diagram of a system for recognizing an environment surrounding a vehicle according to a second embodiment.

FIG. 48 shows a hardware block diagram of a system for recognizing an environment surrounding a vehicle according to a second embodiment. Major differences from the first embodiment described with reference to FIGS. 1 through 47 include the following. Specifically, a front camera image recognition unit 102 is disposed inside a front camera 101; and a rear camera image recognition unit 103 is disposed in another vehicle control function 2510*a* or onboard information function 2510*b*. Accordingly, the same processes for recognizing and evaluating the surrounding environment as those of the first embodiment apply unless otherwise noted. Differences from the first embodiment will be described below.

The front camera 101 includes a lens 2501, an imaging device (CCD) 2502, a CPU 2503, and a memory (not shown). The front camera 101 achieves the function of the front camera image recognition unit 102 using the CPU 2503 and the memory. A rear camera 108, on the other hand, includes a lens 2504 and an imaging device (CCD) 2505.

The front camera 101 is connected to a running control function 2510*a* or an onboard information function 2510*b* (hereinafter referred to as "vehicle control apparatus 2506") via a CAN 2507 to permit data exchanged therebetween. The vehicle control apparatus 2506 has a function of the rear camera image recognition unit 103, in addition to those of the running control function 2510*a* and the onboard information function 2510*b*.

The rear camera 108 and the vehicle control apparatus 2506 are connected via an image signal line 2509 and a dedicated signal line 2508. The image taken by the rear camera 108 is transmitted to the rear camera image recognition unit 103 of the vehicle control apparatus 2506 over the image signal line 2509. A signal for controlling the rear camera 108 is transmitted from the rear camera image recognition unit 103 of the vehicle control apparatus 2506 over the dedicated signal line 2508.

The arrangement according to the second embodiment allows, if applied to a case involving a large volume of data being transmitted between the rear camera image recognition unit 103 and the running control function 2510*a* or the onboard information function 2510*b*, a large volume of data to be transmitted using an internal bus of the vehicle control apparatus 2506. This offers a good system performance.

Third Embodiment

Figure 49:
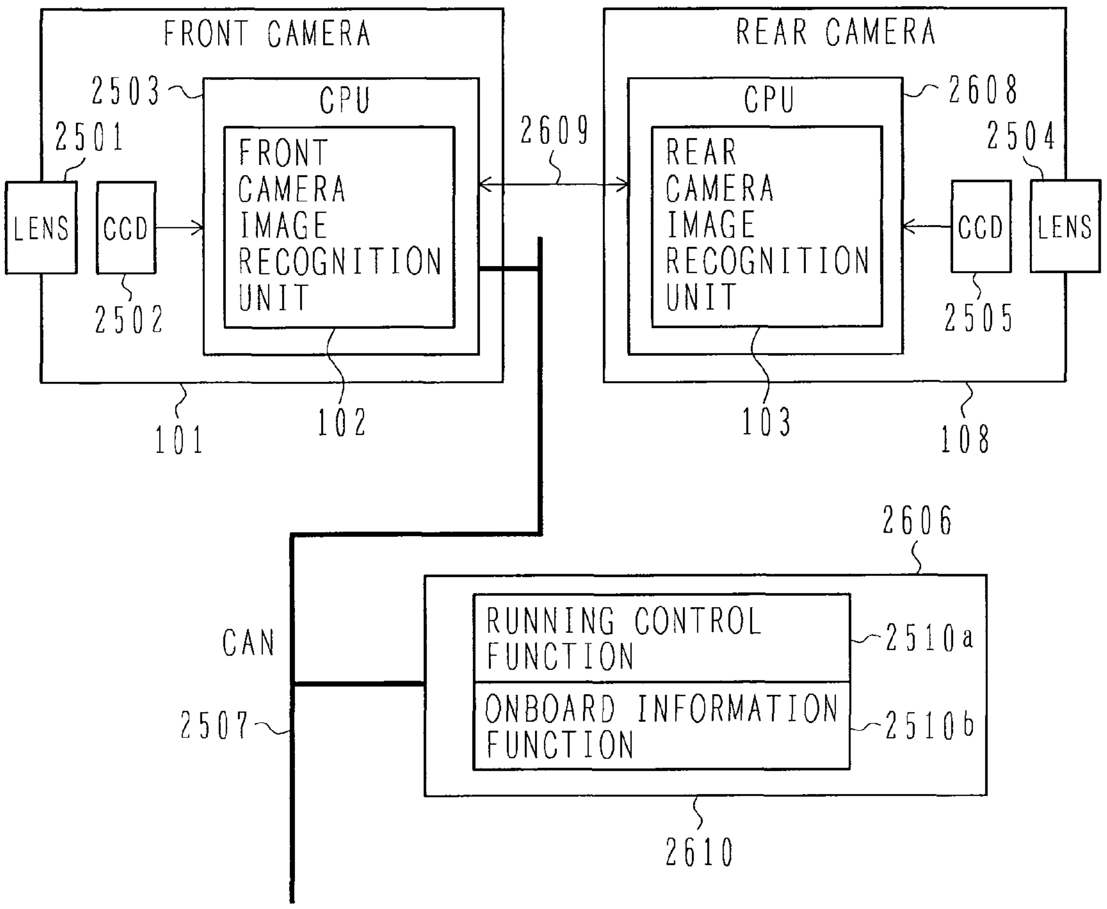
FIG. 49 shows a block diagram of a system for recognizing an environment surrounding a vehicle according to a third embodiment.

FIG. 49 shows a hardware block diagram of a system for recognizing an environment surrounding a vehicle according to a third embodiment. Major differences from the first embodiment described with reference to FIGS. 1 through 47 include the following. Specifically, a front camera image recognition unit 102 is disposed inside a front camera 101; and a rear camera image recognition unit 103 is disposed inside a rear camera 108. Accordingly, the same processes for recognizing and evaluating the surrounding environment as those of the first embodiment apply unless otherwise noted. Differences from the first embodiment will be described below.

The front camera 101 shares the same arrangement with that of the second embodiment, except that the front camera 101 according to the third embodiment is connected to the rear camera 108 via a dedicated signal line 2609.

The rear camera 108 includes a lens 2504, an imaging device (CCD) 2505, a CPU 2608, and a memory (not shown). The rear camera 108 achieves the function of the rear camera image recognition unit 103 using the CPU 2608 and the memory.

The front camera 101 has a CPU 2503 connected to the CPU 2608 of the rear camera 108 with the dedicated signal line 2609. The CPU 2503 and the CPU 2608 exchange data therebetween. Further, a vehicle control apparatus 2606 mounted with a running control function 2510*a* and an onboard information function 2510*b*, the front camera 101, and the rear camera 108 transmit data to each other via a CAN 2607.

The arrangement according to the third embodiment offers a good system performance when applied to a case involving a large processing load on the front camera image recognition unit 102 and the rear camera image recognition unit 103.

Fourth Embodiment

Figure 50:
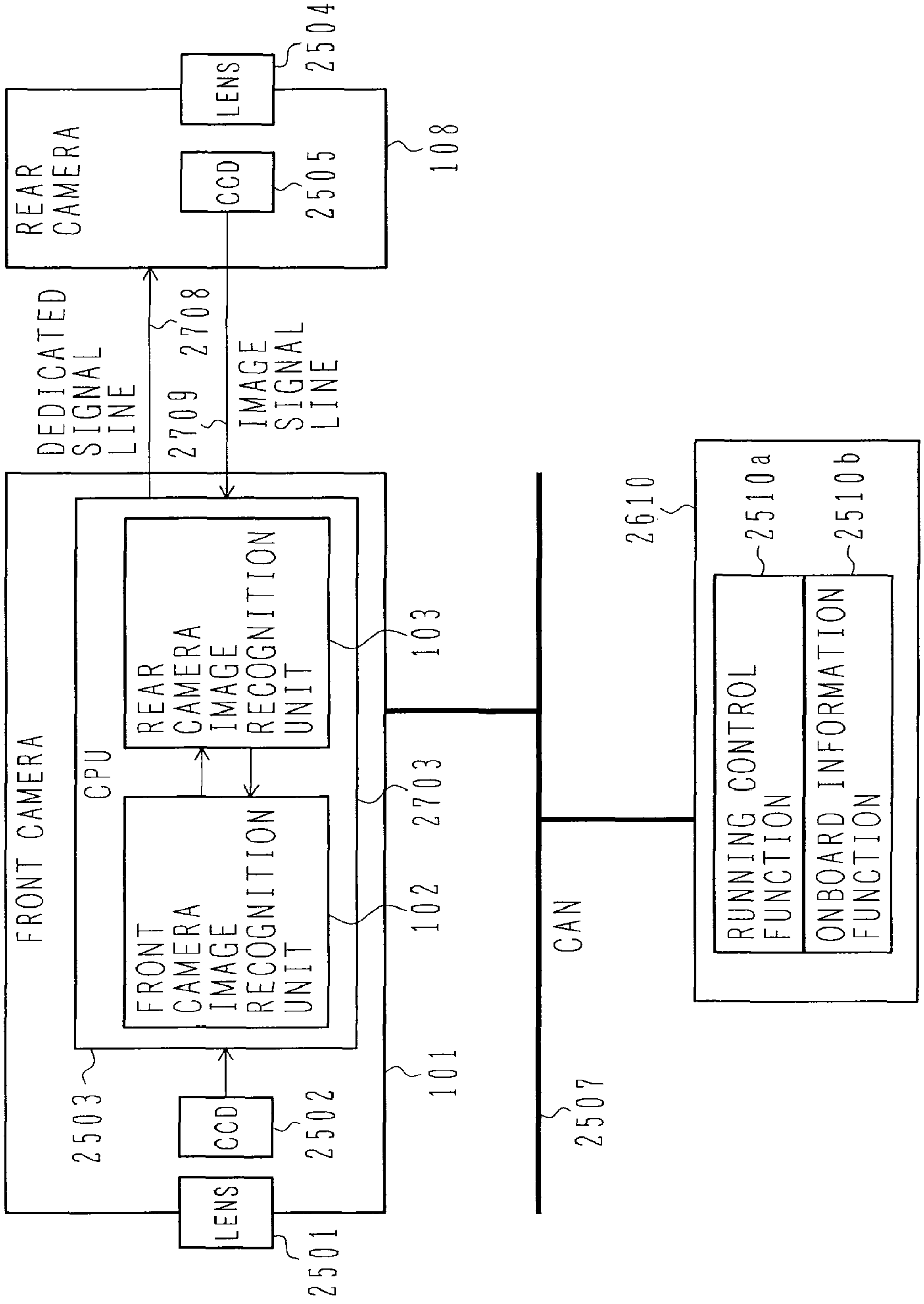
FIG. 50 shows a block diagram of a system for recognizing an environment surrounding a vehicle according to a fourth embodiment.

FIG. 50 shows a hardware block diagram of a system for recognizing an environment surrounding a vehicle according to a fourth embodiment. Major differences from the first embodiment described with reference to FIGS. 1 through 47 include the following. Specifically, a front camera image recognition unit 102 and a rear camera image recognition unit 103 are disposed inside a front camera 101. Accordingly, the same processes for recognizing and evaluating the surrounding environment as those of the first embodiment apply unless otherwise noted. Differences from the first embodiment will be described below.

The front camera 101 includes a lens 2501, an imaging device (CCD) 2502, a CPU 2703, and a memory (not shown). The front camera 101 achieves the functions of the front camera image recognition unit 102 and the rear camera image recognition unit 103 using the CPU 2703 and the memory. The rear camera 108 is arranged in the same manner as in the second embodiment (FIG. 25), except that the rear camera 108 is connected to the front camera 101 with an image signal line 2709 and a dedicated signal line 2708.

The front camera 101 and the rear camera 108 are connected with the image signal line 2709 and the dedicated signal line 2708. The image taken by the rear camera 108 is transmitted to the rear camera image recognition unit 103 in the front camera 101 over the image signal line 2709. A signal for controlling the rear camera 108 is transmitted from the rear camera image recognition unit 103 in the front camera 101 to the rear camera 108 over the dedicated signal line 2708.

A vehicle control apparatus 2610 mounted with a running control function 2510*a* and an onboard information function 2510*b* and the front camera 101 are connected with a CAN 2507, by which data can be mutually exchanged therebetween.

The arrangement according to the fourth embodiment offers good system performance when applied to a case involving a large volume of data transferred between the front camera image recognition unit 102 and the rear camera image recognition unit 103.

Fifth Embodiment

Figure 51:
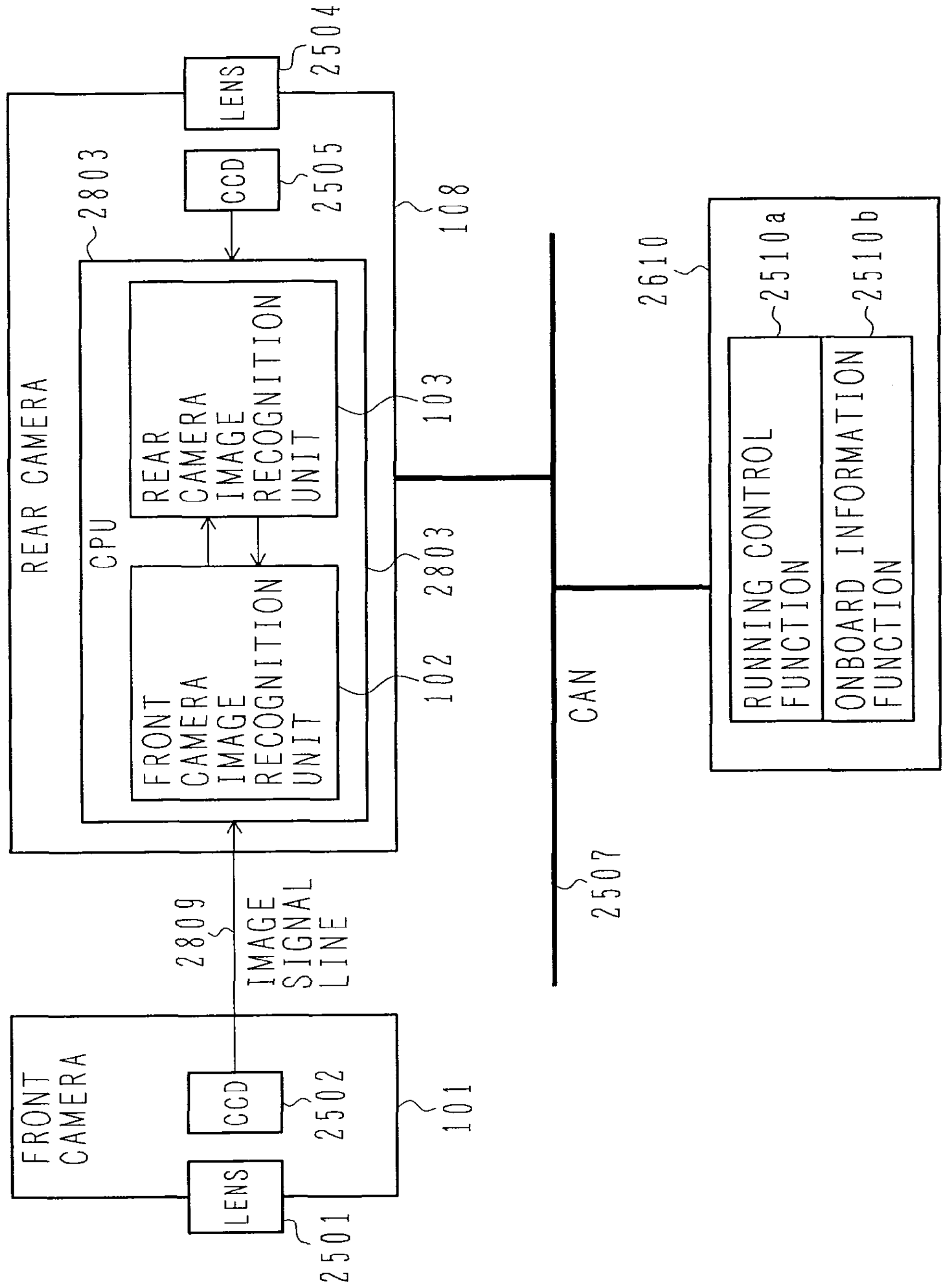
FIG. 51 shows a block diagram of a system for recognizing an environment surrounding a vehicle according to a fifth embodiment.

FIG. 51 shows a hardware block diagram of a system for recognizing an environment surrounding a vehicle according to a fifth embodiment. Major differences from the first embodiment described with reference to FIGS. 1 through 47 include the following. Specifically, a front camera image recognition unit 102 and a rear camera image recognition unit 103 are disposed inside a rear camera 108. Accordingly, the same processes for recognizing and evaluating the surrounding environment as those of the first embodiment apply unless otherwise noted. Differences from the first embodiment will be described below.

The front camera 101 includes a lens 2501 and an imaging device (CCD) 2502. The rear camera 108 includes a lens 2504, an imaging device 2505, a CPU 2803, and a memory (not shown). The rear camera 108 achieves the functions of the front camera image recognition unit 102 and the rear camera image recognition unit 103 using the CPU 2803 and the memory.

The front camera 101 and the rear camera 108 are connected with an image signal line 2809. The image taken by the front camera 101 is transmitted to the front camera image recognition unit 102 in the rear camera 108 over the image signal line 2809. A vehicle control apparatus 2610 mounted with a running control function 2510*a* and an onboard information function 2510*b* and the rear camera 108 are connected with a CAN 2507, by which data can be mutually exchanged therebetween.

The arrangement according to the fifth embodiment offers good system performance when applied to a case involving a large volume of data transferred between the front camera image recognition unit 102 and the rear camera image recognition unit 103.

Sixth Embodiment

Figure 52:
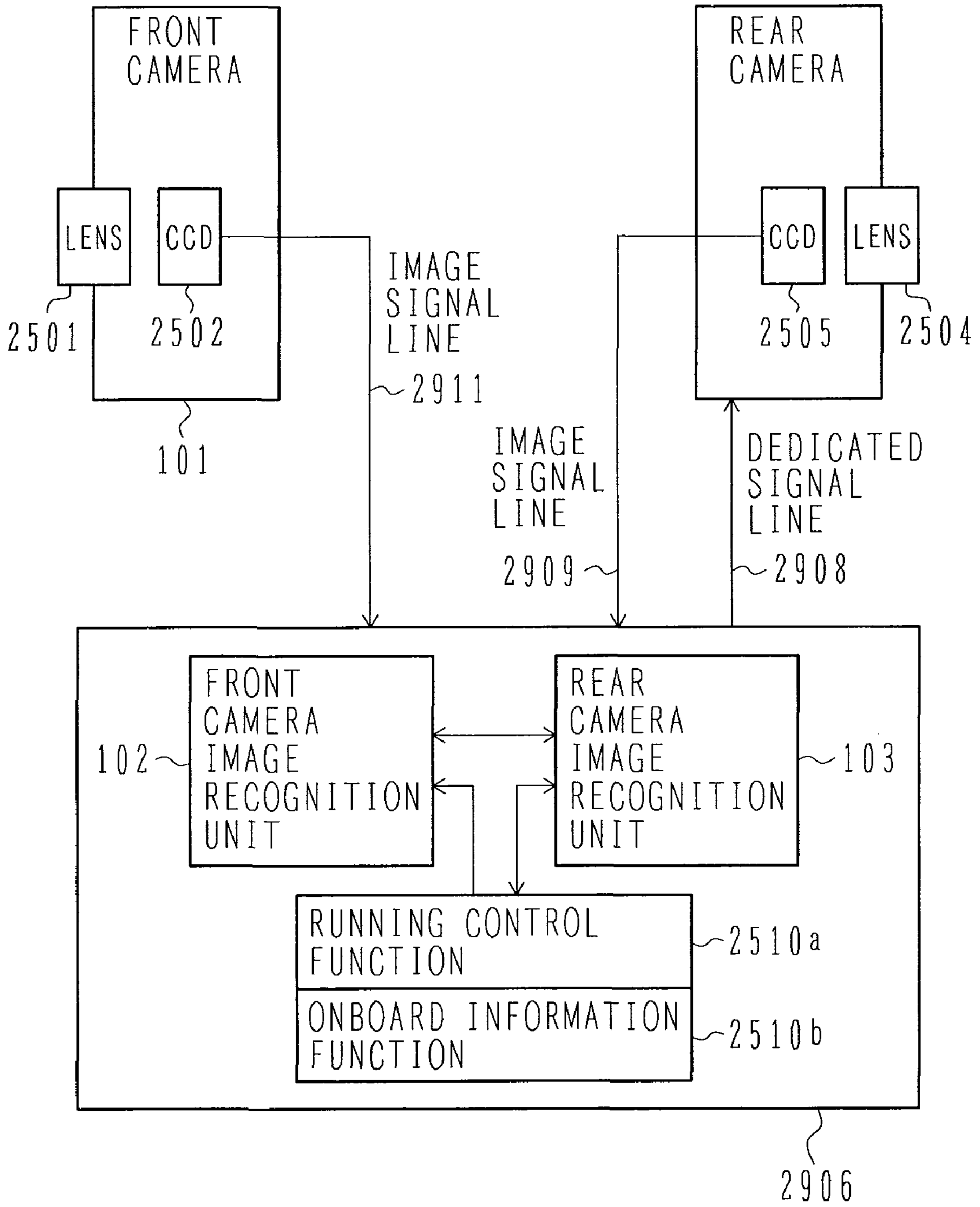
FIG. 52 shows a block diagram of a system for recognizing an environment surrounding a vehicle according to a sixth embodiment.

FIG. 52 shows a hardware block diagram of a system for recognizing an environment surrounding a vehicle according to a sixth embodiment. Major differences from the first embodiment described with reference to FIGS. 1 through 47 include the following. Specifically, a front camera image recognition unit 102 and a rear camera image recognition unit 103 are disposed inside a vehicle control apparatus 2906. Accordingly, the same processes for recognizing and evaluating the surrounding environment as those of the first embodiment apply unless otherwise noted. Differences from the first embodiment will be described below.

The front camera 101 includes a lens 2501 and an imaging device 2502. The rear camera 108 includes a lens 2504 and an imaging device (CCD) 2505. The vehicle control apparatus 2906 has the functions of the front camera image recognition unit 102 and the rear camera image recognition unit 103, in addition to those original functions of a running control function 2510*a* or an onboard information function 2510*b*.

The front camera 101 and the vehicle control apparatus 2906 are connected together with an image signal line 2911. The image taken by the front camera 101 is transmitted to the front camera image recognition unit 102 in the vehicle control apparatus 2906 over the image signal line 2911. The rear camera 108 and the vehicle control apparatus 2906, on the other hand, are connected together with an image signal line 2909 and a dedicated signal line 2908. The image taken by the rear camera 108 is transmitted to the rear camera image recognition unit 103 in the vehicle control apparatus 2906 over the image signal line 2909. A signal for controlling the rear camera 108 is transmitted to from the rear camera image recognition unit 103 in the vehicle control apparatus 2906 to the rear camera 108 over the dedicated signal line 2908.

The arrangement according to the sixth embodiment offers good system performance when applied to a case involving a large volume of data transferred across the front camera image recognition unit 102, the rear camera image recognition unit 103, and the running control function 2510*a* or the onboard information function 2510*b*.

A method for inspecting to determine if the present invention is operational will be described below.

The vehicle 1 with the arrangement as shown in FIG. 1 runs on a road. A check is made on the recognition rate of the object to be recognized on the road, which is obtained by the rear camera image recognition unit 103 during normal operation by measuring the operation in the vehicle control apparatus 106. Then, with the lens of the front camera 101 covered in the arrangement shown in FIG. 1, the vehicle 1 runs on the same road, at the same speed, and in the same running manner as in the above. The recognition rate of the object to be recognized on the road, which is obtained by the rear camera image recognition unit 103, is measured. The recognition rate under normal operation is then compared against that with the lens of the front camera 101 covered. If the recognition rate under normal operation is higher than the recognition rate with the lens of the front camera 101 covered, it may be determined that the present invention is operational in the arrangement shown in FIG. 1.

Another possible method for inspecting to determine if the present invention is operational is as follows. Specifically, the vehicle 1 with the arrangement as shown in FIG. 1 runs on a road having significant changes in luminance and an image taken by the rear camera 108 is acquired. Then, the vehicle 1 is run on a road having the same significant changes in luminance as above with the lens of the front camera 101 covered and an image taken by the rear camera 108 is acquired. The image acquired when the lens of the front camera 101 is not covered is compared against that acquired when the lens of the first camera 101 is covered. If timing of gain adjustment and exposure control adjustment is earlier in the image of the former case, then it may be determined that the rear camera control section 107 of the present invention is operational in the arrangement shown in FIG. 1.

Seventh Embodiment

Each of the first to sixth embodiments is concerned with the arrangement using the front camera and the rear camera. Each embodiment may include a plurality of cameras, each having a unique field of view and imaging the same object of interest at unique timing. Embodiments will be described below with reference to FIGS. 53 and 54, in which a plurality of cameras is disposed to face the same direction in the vehicle.

Figure 53:
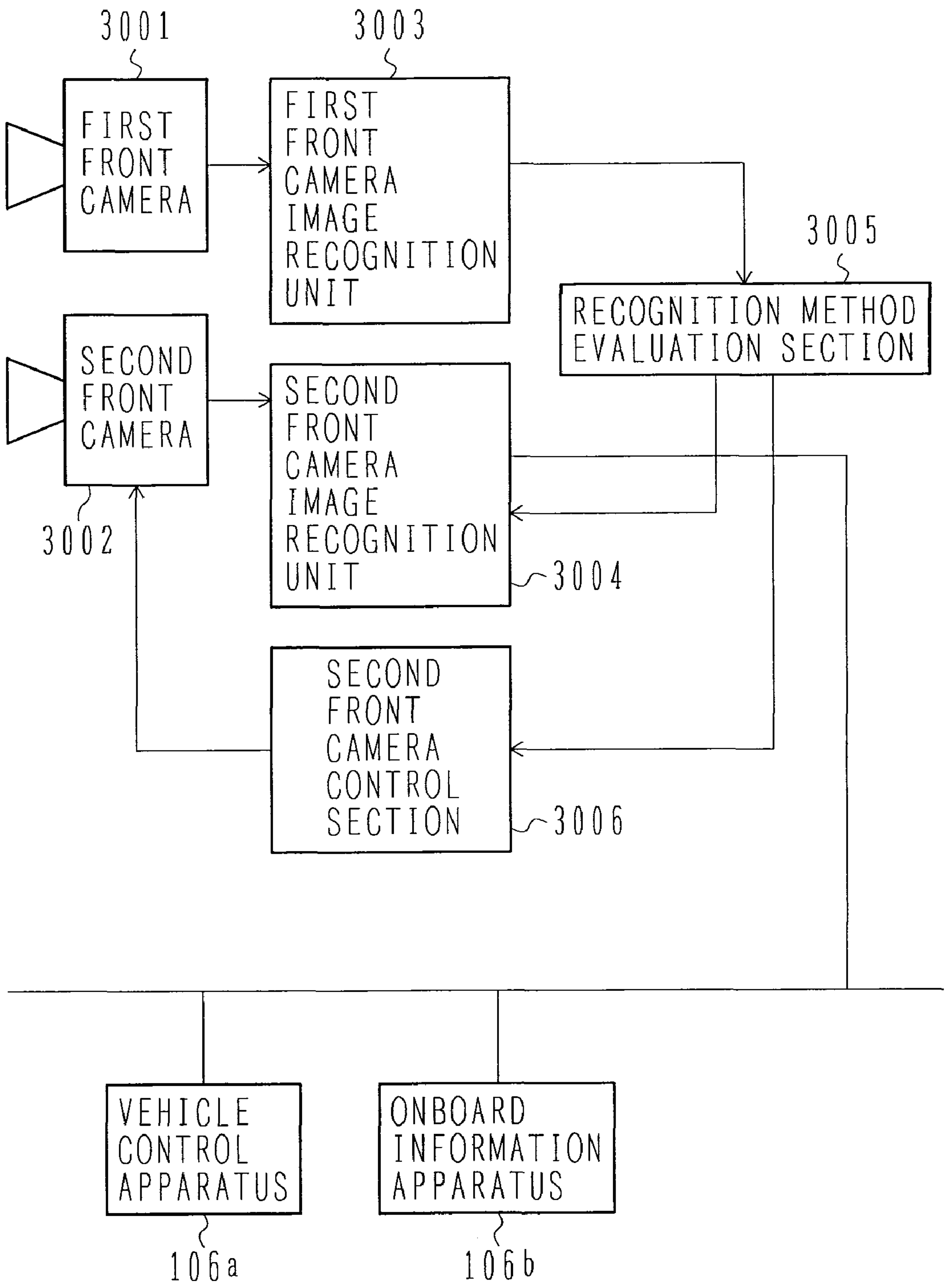
FIG. 53 shows a block diagram of a system for recognizing an environment surrounding a vehicle according to a seventh embodiment.

Referring to FIG. 53, a first front camera 3001 is disposed with an angle of depression that allows an image at a far site forward of the vehicle to be taken. A second front camera 3002 is disposed such that the second front camera 3002 can image a site closer to the vehicle than the image taken by the first front camera 3001, preferably at a site immediately near the vehicle. A second front camera image recognition unit 3004 detects the type, position, angle, and the like of a road surface marking and a white line in the image taken by the second front camera 3002. Results of the detection are transmitted to a vehicle control apparatus 106*a* or an onboard information apparatus 106*b*.

A first front camera image recognition unit 3003 detects the type, position, angle, and the like of a road surface marking, a white line, a traffic signal, and a sign in the image taken by the first front camera 3001. A recognition method evaluation section 3005 receives an output from the first front camera image recognition unit 3003 representing recognition results concerning the road surface marking, the white line, the traffic signal, and the sign located forwardly of the vehicle. The recognition method evaluation section 3005 then establishes a recognition method in the second front camera image recognition unit 3004 and transmits the recognition method to the second front camera image recognition unit 3004.

The first front camera image recognition unit 3003 analyzes luminance information of the image taken by the first front camera 3001 and detects luminance of the entire image or the position of a shadow on the road surface. The first front camera image recognition unit 3003 then transmits the results to the recognition method evaluation section 3005. The recognition method evaluation section 3005 schedules an adequate gain and exposure time for the second front camera 3002 and transmits the schedule to a second front camera control section 3006. In accordance with the schedule of the gain and exposure time for the second front camera 3002 received from the recognition method evaluation section 3005, the second front camera control section 3006 controls the second front camera 3002. The first front camera 3001, which images a view far forward of the vehicle, is advantageous in identifying trend in the entire image. The second front camera 3002, which images a view immediately near the vehicle on the other hand, is advantageous in detecting with high accuracy the position and angle of the road surface marking and white line to be recognized.

Processes performed by the first front camera image recognition unit 3003 are identical to those performed by the front road surface marking recognition section 102*a* shown in FIG. 2. Processes performed by the second front camera image recognition unit 3004 are identical to those performed by the front road surface marking recognition section 102*a* shown in FIG. 2. Processes performed by the second front camera control section 3006 are identical to those performed by the rear camera control section 107 shown in FIG. 2. Unlike the case with the rear camera, however, no inversion occurs in a left-and-right positional relationship between images taken by the two cameras and coordinate conversion is different from that of the embodiment shown in FIG. 1.

Figure 54:
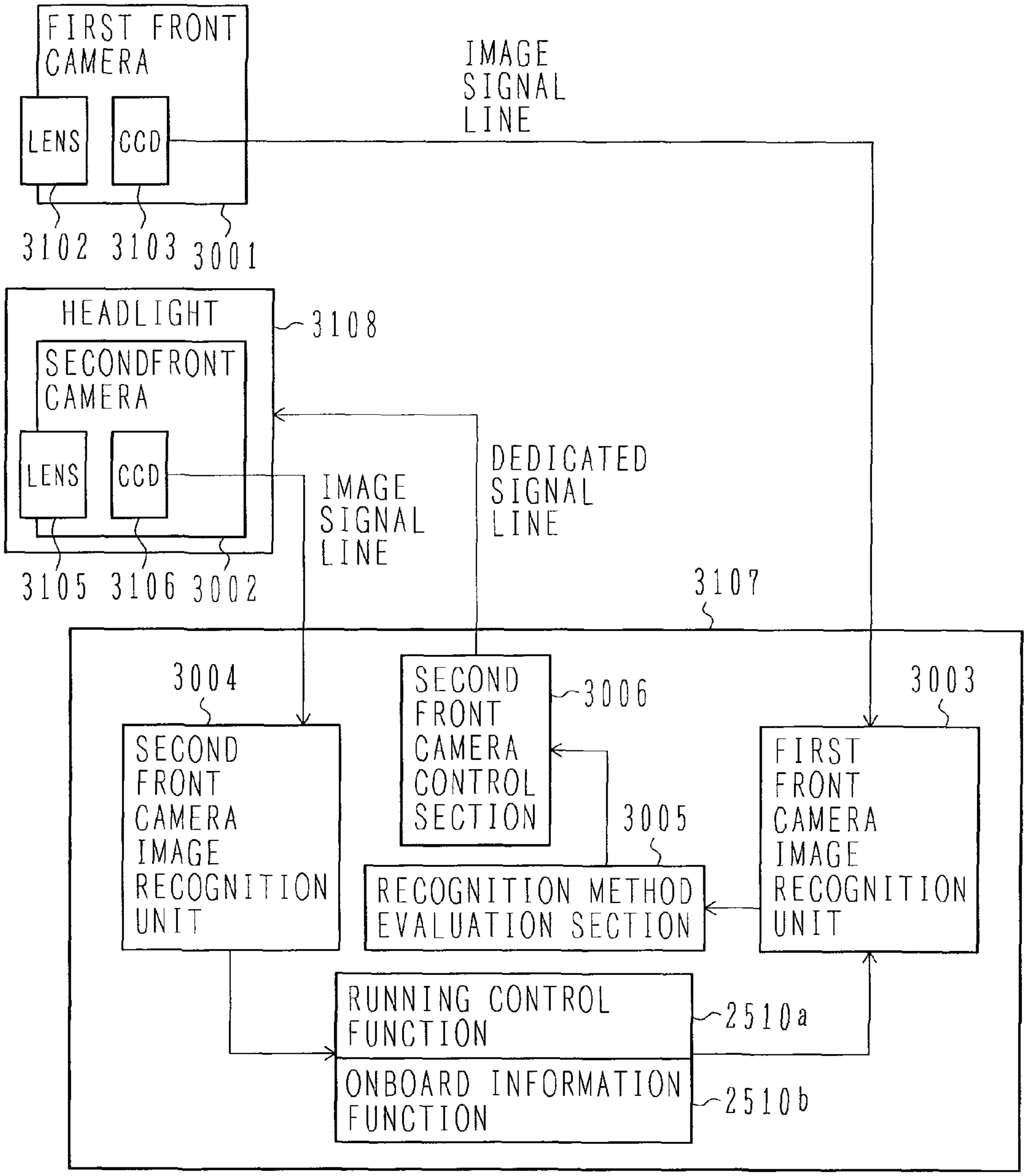
FIG. 54 shows a block diagram of a system for recognizing an environment surrounding a vehicle according to the seventh embodiment.

FIG. 54 shows a hardware block diagram that achieves the embodiment shown in FIG. 53. The first front camera 3001 includes a lens 3102 and an imaging device (CCD) 3103. The second front camera 3002 includes a lens 3105 and an imaging device 3106. The second front camera 3002 is disposed in a headlight 3108.

A vehicle control apparatus or an onboard information apparatus (hereinafter referred to as "onboard control apparatus or the like") 3107 has mounted therein the first front camera image recognition unit 3003, the second front camera image recognition unit 3004, the recognition method evaluation section 3005, the second front camera control section 3006, and a running control function 2510*a* or an onboard information function 2510*b*. The first front camera 3001 and the onboard control apparatus or the like 3107 are connected together with an image signal line. The image taken by the first front camera 3001 is transmitted to the first front camera image recognition unit 3003 in the onboard control apparatus or the like 3107 over an image signal line 2. The second front camera 3002 and the onboard control apparatus or the like 3107 are connected together with an image signal line 2909 and a dedicated signal line 2908. The image taken by the second front camera 3002 is transmitted to the second front camera image recognition unit 3004 inside the onboard control apparatus or the like 3107 over the dedicated signal line 2908. A signal controlling the second front camera 3002 is transmitted from the second front camera control section 3006 inside the onboard control apparatus or the like 3107 to the second front camera 3002 over the dedicated signal line 2908.

The road surface marking recognition system described in the specification is applicable, in a vehicle mounted with a plurality of cameras, to a preventive safety system that prevents collision with other vehicles and provides driving support by recognizing vehicles running near the host vehicle other than road surface markings.

What is claimed is:

1. An apparatus for recognizing an environment surrounding a vehicle, the apparatus comprising:

a first image input unit for imaging an environment surrounding the vehicle;

an object recognition unit for recognizing an object by processing an image inputted thereto from the first image input unit, the object being present in the environment surrounding the vehicle; and a second image input unit disposed on the vehicle, wherein the second image input unit uses a result of the recognition of the object present in the environment surrounding the vehicle to adjust a parameter for the first image input unit.

2. The apparatus for recognizing an environment surrounding a vehicle according to claim 1, wherein the second image input unit uses the result of the recognition of the object present in the environment surrounding the vehicle to determine a type of the object recognized by the object recognition unit and a start timing of the object recognition unit.

3. The apparatus for recognizing an environment surrounding a vehicle according to claim 1, wherein information on luminance of an image taken by the second image input unit is used to adjust a gain of the first image input unit.

4. The apparatus for recognizing an environment surrounding a vehicle according to claim 1, wherein the information on the luminance of the image taken by the second image input unit is used to control an exposure of the first image input unit.

5. The apparatus for recognizing an environment surrounding a vehicle according to claim 1, wherein information on a position and an angle of the object recognized by the first image input unit disposed forwardly of the vehicle is used to determine an area to be processed on a screen in an image recognition unit for recognizing an image of the second image input unit disposed on rearward of the vehicle.

6. The apparatus for recognizing an environment surrounding a vehicle according to claim 3, wherein information on luminance and a position of a shadow on a road surface recognized by the first image input unit disposed forwardly of the vehicle is used to adjust a gain of the second image input unit disposed on rearward of the vehicle.

* * * * *